US007191155B2

(12) United States Patent
Maruyama et al.

(10) Patent No.: US 7,191,155 B2
(45) Date of Patent: Mar. 13, 2007

(54) LICENSE TRANSMITTING AND DISTRIBUTING SYSTEM UNDER OFFLINE ENVIRONMENT AND METHOD THEREOF

(75) Inventors: Hidefumi Maruyama, Kawasaki (JP); Takahisa Hatakeyama, Kawasaki (JP); Takayuki Hasebe, Kawasaki (JP); Tetsuhiro Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 704 days.

(21) Appl. No.: 10/127,443

(22) Filed: Apr. 23, 2002

(65) Prior Publication Data
US 2003/0037006 A1 Feb. 20, 2003

(30) Foreign Application Priority Data
Aug. 15, 2001 (JP) .............................. 2001-246398

(51) Int. Cl.
H04L 9/00 (2006.01)
(52) U.S. Cl. .......................................... 705/59; 380/47
(58) Field of Classification Search ................ 705/26, 705/59; 713/165; 380/270, 277, 47; 703/1
See application file for complete search history.

(56) References Cited

U.S. PATENT DOCUMENTS

| 5,392,351 | A | | 2/1995 | Hasebe et al. | |
| 5,555,304 | A | | 9/1996 | Hasebe et al. | |
| 5,579,222 | A | * | 11/1996 | Bains et al. | 705/26 |
| 5,636,277 | A | | 6/1997 | Nagahama | |
| 5,737,415 | A | | 4/1998 | Akiyama et al. | |
| 5,796,824 | A | | 8/1998 | Hasebe et al. | |
| 6,049,670 | A | | 4/2000 | Okada et al. | |
| 6,816,842 | B1 | * | 11/2004 | Singh et al. | 705/59 |
| 6,915,425 | B2 | * | 7/2005 | Xu et al. | 713/165 |
| 2001/0037256 | A1 | * | 11/2001 | Yazawa | 705/26 |
| 2002/0010681 | A1 | * | 1/2002 | Hillegass et al. | 705/59 |
| 2002/0176580 | A1 | * | 11/2002 | Horiuchi et al. | 380/270 |
| 2002/0183985 | A1 | * | 12/2002 | Hori et al. | 703/1 |
| 2004/0179691 | A1 | * | 9/2004 | Hori et al. | 380/277 |

FOREIGN PATENT DOCUMENTS

| EP | 1130492 | 9/2001 |
| EP | 1237324 | 9/2002 |
| JP | 5-257816 | 10/1993 |
| JP | 8-101867 | 4/1996 |
| JP | 8-106382 | 4/1996 |
| JP | 8-190529 | 7/1996 |
| JP | 2000-293439 | 10/2000 |
| JP | 2000293439 A | 10/2000 |
| JP | 2001-175606 | 6/2001 |
| WO | 1/41356 | 6/2001 |

OTHER PUBLICATIONS

"Development of Copyright Protective Multimedia Cards", http://www.sdl.Hitachi.co.jp/Japanese/results/thema/contest/smmc/smmc.htm.
Keitaide-Music Technical Specification, Keitaide-Music Consortium, May 18, 2001, pp. 1-24.

* cited by examiner

Primary Examiner—Salvatore Cangialosi
(74) Attorney, Agent, or Firm—Staas & Halsey LLP

(57) ABSTRACT

An LA (License Agent) (or a license chip having the same function as the LA) is disposed in a PC (Personal Computer), a content distribution server, and a medium attached to a PD (Private Device or Portable Device) that use a license for electronic data. A content and electronic data are encrypted corresponding to a license. The encrypted content and electronic data are distributed among them. However, the license is distributed between the LAs as safe communication means. Thus, the license can be correctly managed and transferred.

16 Claims, 18 Drawing Sheets

| PART 1 | PART 2 | PART 3 | PART 4 | PART 5 |
|--------|--------|--------|--------|--------|

PART 1: SESSION KEY ENCRYPTED BY INDIVIDUAL PUBLIC KEY OF LA OF
RECEPTION SIDE

PART 2: THE FOLLOWING DATA HAVE BEEN ENCRYPTED WITH SESSION KEY
- SUBJECT NAME OF INDIVIDUAL PUBLIC KEY CERTIFICATE OF LA OF
  GENERATION SIDE (TRANSMISSION SIDE) OF OFFLINE LICENSE
- OFFLINE LICENSE TRANSACTION ID
  ASSIGNED BY LA OF GENERATION SIDE (TRANSMISSION SIDE) OF
  OFFLINE LICENSE
- LICENSE (ONLINE LICENSE)
- ACCESS CONDITION IN TRM OF RECEPTION SIDE
  NUMBER OF TIMES OF (PERIOD FOR) WHICH OFFLINE LICENSE
  CAN BE MOVED
  OTHERS
- ACCESS CONDITION IN TRM OF CONTENT REPRODUCTION·ELECTRONIC DATA
  PROCESSING SYSTEM
  OTHERS

PART 3: DIGITAL SIGNATURE WITH CLASS SECRET KEY OF LA OF GENERATION
SIDE (TRANSMISSION SIDE) OF OFFLINE LICENSE

PART 4: INDIVIDUAL PUBLIC KEY CERTIFICATE OF LA OF GENERATION SIDE
(TRANSMISSION SIDE) OF OFFLINE LICENSE

PART 5: CLASS PUBLIC KEY CERTIFICATE OF LA OF GENERATION SIDE
(TRANSMISSION SIDE) OF OFFLINE LICENSE

FIG. 6

| TIME STAMP 1 | CONTENT ID | TRANSAC- TION ID | ENCRYPTED LICENSE | SUBJECT NAME OF PUBLIC KEY CERTIFICATE OF TRANSMIS- SION SIDE | OFFLINE TRANSAC- TION ID 1 | TIME STAMP 2 |
|---|---|---|---|---|---|---|

←──────────────── FIXED LENGTH ────────────────→

F I G. 8

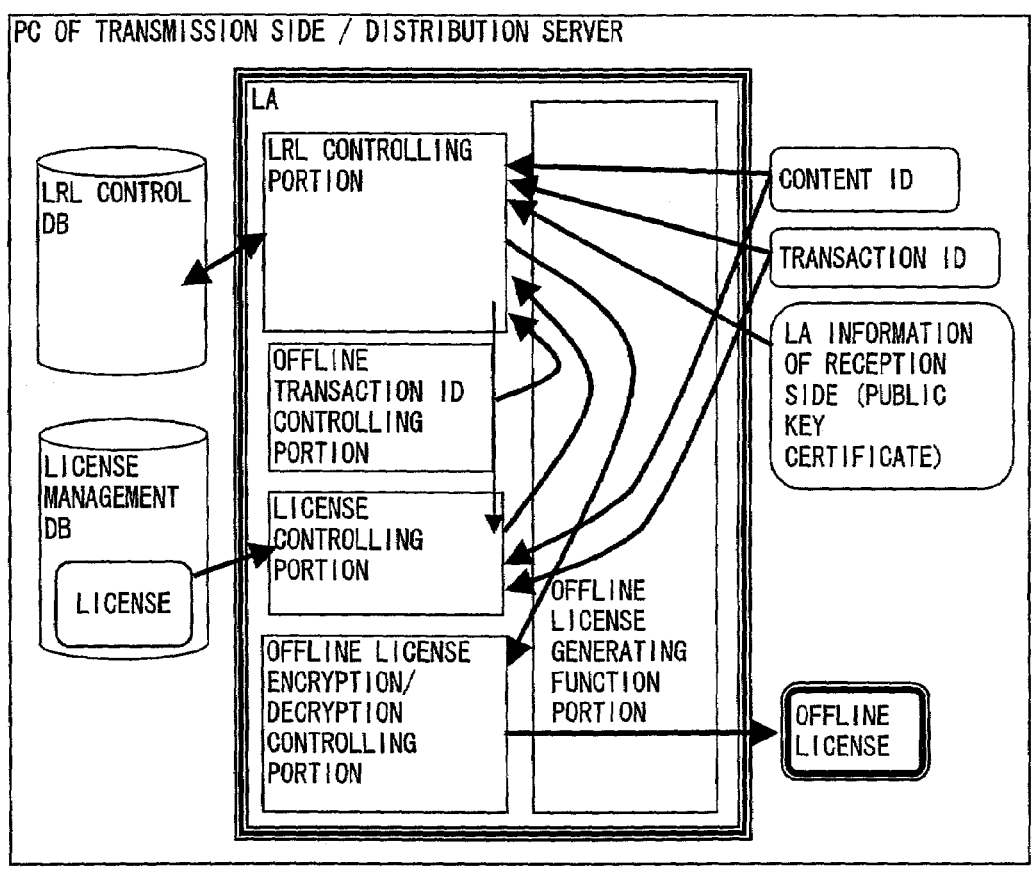
F I G. 9

LICENSE TRANSMITTING AND DISTRIBUTING SYSTEM UNDER OFFLINE ENVIRONMENT AND METHOD THEREOF

BACKGROUND OF THE INVENTION

1. Field of the Invention

The present invention relates to a system that allows a license for a digital content and so forth to be securely transmitted and transferred under an offline environment.

2. Description of the Related Art

Nowadays, the Internet and computers are becoming popularized and advanced. Besides program files, network sales of music data files and video data files and so forth are started. However, since these files are electronic data, once they are downloaded, they can be easily copied. Thus, their copyrights and related rights will be easily infringed. To solve such a problem, it is desired to accomplish a system for distributing and managing licenses for these electronic files.

The technologies that have been disclosed for solving such a problem have the following disadvantages.

Once copyrighted electronic data is distributed between users, the transmission side has no means for controlling the access for the copyrighted electronic data.

Distribution of NDA Document between Companies

Even if an electronic document is distributed to a particular person of a company who has contracted for NDA (Non Disclosure Agreement), there is a possibility of which the electronic document is copied and/or printed and distributed to other people who have not contracted for the NDA.

Distribution of Material-Under-Review in Company

When a material under review is distributed to only a concerned group, the material will be copied and/or printed. As a result, the material will be distributed to other members. Thus, there is a possibility of which the information will be leaked out to the outside of the company.

Thus, it is necessary to provide a function that allows the creator of electronic data to affect his or her will to affect the access control after the electronic data has been transmitted.

In prior art, as countermeasures against such a problem, a dedicated data transferring system as shown in FIG. 1 is used.

FIG. 1 is a schematic diagram showing the structure of the conventional dedicated data transferring system for managing licenses.

In FIG. 1, a PC (Personal Computer: user terminal unit) of a content transmission side of a content uses a dedicated data transferring client unit so as to perform a transferring process for the content to be transferred. The PC transmits the processed content to a dedicated server corresponding to a secret protection transferring system. A PC of another user (user 1) that receives the content has a dedicated client unit. The PC of the user 1 receives the content from the dedicated server corresponding to the dedicated secret protection transferring system. After the PC performs the transferring process for the received content, the content is stored in a local hard disk or the like so that the user 1 can reference the received content.

When the user 1 tries to transfer the content to another user 2, the user 1 transfers the content to the dedicated server corresponding to the dedicated secret protection transferring system uses a transfer processing function of the dedicated client unit. The user 2 downloads the content from the dedicated server to a dedicated client unit corresponding to the dedicated secret protection transferring system.

The system shown in FIG. 1 has the following problems.

1) When electronic data is transferred, the dedicated client units should be used. Thus, electronic data should be transmitted corresponding to the specifications of the dedicated client units (for example, electronic data cannot be transmitted and received using application programs of the users.)

In addition, when electronic data is transmitted, the dedicated server should be used. Thus, for example, to allow electronic data to be transmitted to and received from users who are the same number of the conventional e-mail users, it is necessary to dispose the same number of dedicated servers as mail servers. However, it is not practical.

2) Since the access control is limited to the PCs, a user cannot store the received electronic data to a portable record medium and reference the electronic data with another PC.

3) The referencing function of electronic data is not protected at all. Thus, electronic data can be easily retrieved from a memory or a swap area. Consequently, it cannot be said that the system is suitable for transmitting important confidential data.

In addition, when a license for a pay content is transferred between users, it was pointed out that the following problems will take place.

Although services for distributing pay contents through the Internet, cellular phone networks (including PHS (Personal Handy-phone System) network), and so forth have been started. In such services, the user should buy a license of a pay content through such a service. Thus, the user cannot transfer the license that he or she bought to another user unless the content and the license are illegally copied. As a result, the license distribution channels on the networks are very limited. From a view point of a seller of a pay content, it is inevitable to lose the following opportunities.

A user cannot transfer his or hear license for a pay content to another user.

When a user buys a license for a pay content as a trial, he or she cannot have his or her acquaintances use the pay content (if they are satisfied with the pay content, they will buy it).

So far, solutions against such problems have not been considered. In other words, in conventional services, contents are illegally copied. Thus, such problems disturbed the distribution of pay contents on networks.

Multicast of Pay Contents

In a conventional pay content multicasting system, the content transmission side and the content reception side share a unique secret key of the content reception side. The content transmission side transmits a license and a content in such a manner that the license has been encrypted by the secret key and that the content has been encrypted by the license. The content transmission side stores the unique secret key of the content reception in a TRM (Tamper Resistant Module) area of an IC card or the like and supplies the IC card or the like to the user. Thus, the user cannot extract the secret key from the IC card or the like.

The content transmission side places an encrypted license for the content reception side to the encrypted content and transmits the resultant data to the content reception side.

FIG. 2 is a schematic diagram showing a mechanism of a conventional pay content multicasting system.

The transmission side scrambles a content with a scramble key and uses the scrambled content as an encrypted content. In addition, the transmission side encrypts the scramble key with a license. The transmission side encrypts the license with secret keys 1, 2, . . . , and n and obtains encrypted licenses 1, 2, . . . , n, respectively. The transmission side transmits as transmission data the encrypted content, encrypted scramble key, and the encrypted licenses 1 to n. The transmission side multi-casts the transmission data through the Internet or a satellite broadcast using a broadcast satellite (BS) or a communication satellite (CS).

A receiving unit has a built-in IC card. Using the IC card, the receiving unit decrypts the received encrypted license i with the secret key i, obtains the license, decrypts the received encrypted scramble key with the obtained license, and obtains the scramble key. Thereafter, the receiving unit descrambles the received encrypted content with the scramble key and obtains the content.

However, the system using the IC card has the following problems.

1) It is inconvenient for the user to hold the IC card.

Unless the user contract with the transmission side to issue the IC card and he or she uses it with the receiving unit, it cannot receive a broadcast. In addition, the user should have IC cards corresponding to contracted distributors (broadcasting stations and so forth) (because each IC card stores a secret key shared by the corresponding distributor). Thus, it is very inconvenient for the user.

2) Problem about compatibility (the case of which an IC card is not used)

When an IC card stores a secret key, if the specifications of IC cards of the distributors are standardized), one receiving unit can receive transmission data from a plurality of distributors (although IC cards corresponding to the number of distributors are required).

When no IC card is used, a secret key is shared by the receiving unit and the transmission side. Thus, it is impractical to receive contents from a plurality of distributors with one receiving unit.

SUMMARY OF THE INVENTION

An object of the present invention is to provide a license transmitting and distributing system that allows a license for electronic data to be formed in an offline license so that the user can conveniently use the license while the security thereof is maintained.

The system according to the present invention is a system for transmitting and distributing a license of a content such as electric documents between users, and a information terminal storing the license comprises: a license agent unit, located in TRM area, generating and storing an offline license, storing an encrypted content in the first storing unit, holding and updating a generation log for each offline license, the first storing unit storing the encrypted content, and the second storing unit storing the generation log, wherein the license of the contents is transmitted and distributed by communicating the offline license only between the license agent units of a plurality of the information terminals.

The method according to the present invention is a method for transmitting and distributing a license of a content such as electric documents between users, and a method in a information terminal storing the license comprises: managing an offline license using a license agent unit, located in TRM area, generating and storing an offline license, storing an encrypted content in the first storing unit, holding and updating a generation log for each offline license, the first storing step storing the encrypted content, and the second storing step storing the generation log, wherein the license of the contents is transmitted and distributed by communicating the offline license only between the license agent units of a plurality of the information terminals.

According to the present invention, the license agent manages licenses distributed off line. Licenses can be transferred between the license agents. As a result, offline licenses that are secured can be transmitted and transferred.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 6 is a schematic diagram showing an outline of the structure of an offline license;

FIG. 8 is a schematic diagram showing the structure of a record of a license management database;

FIG. 9 is a schematic diagram showing a process for generating an offline license (making offline license);

DESCRIPTION OF PREFERRED EMBODIMENT

Figure 1:
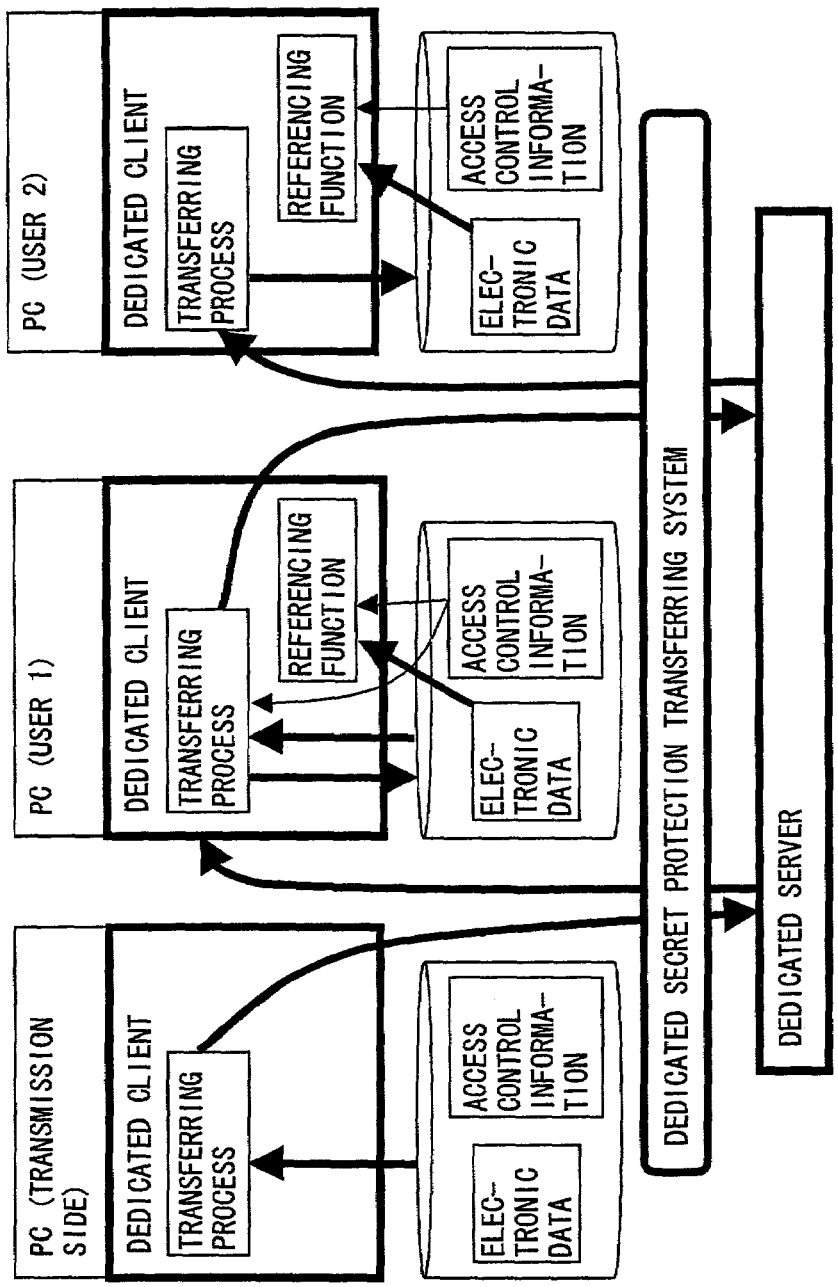
FIG. 1 is a schematic diagram showing a conventional dedicated data transferring system for managing licenses.
Figure 2:
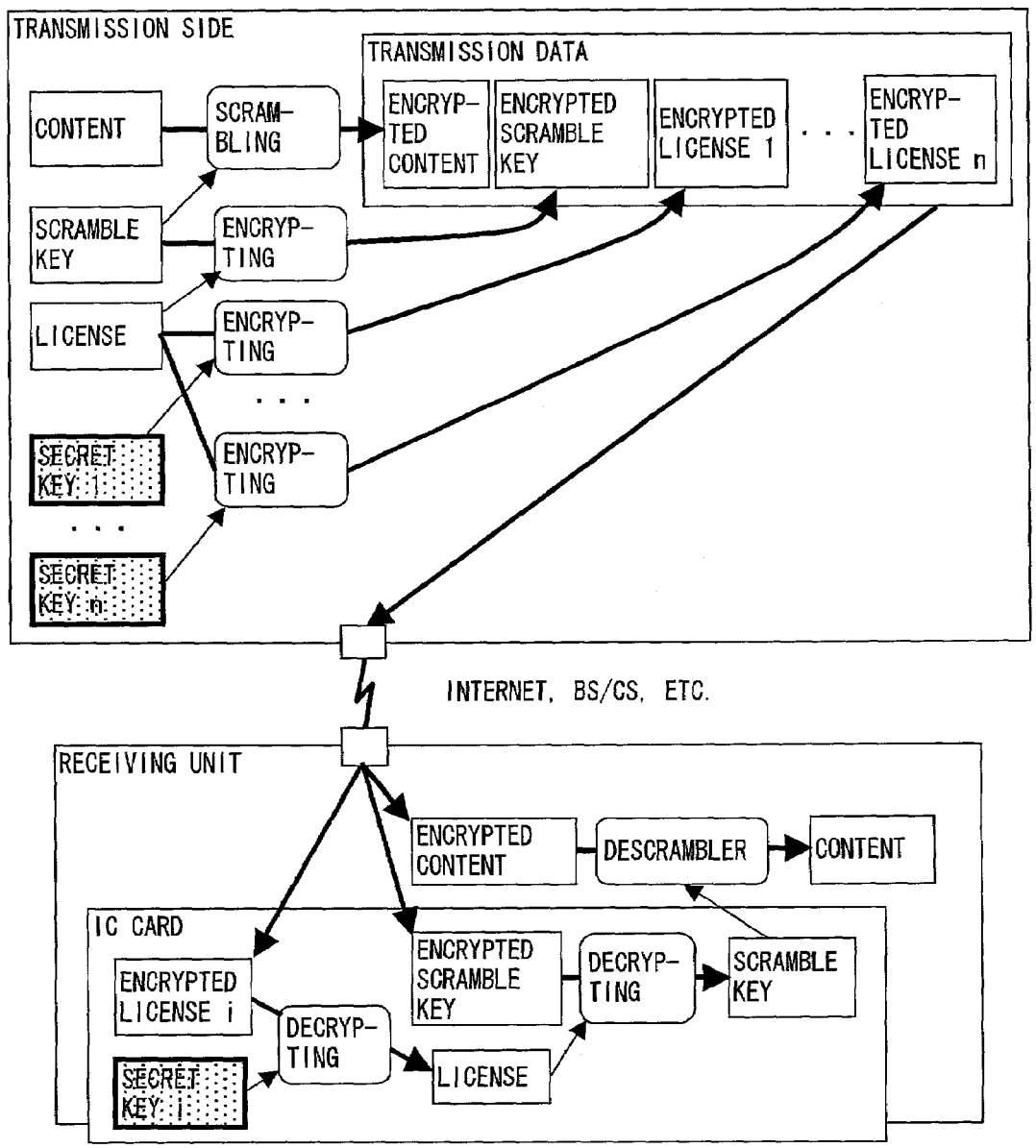
FIG. 2 is a schematic diagram showing a mechanism of a conventional pay content multicasting system.

In the following description, a function for encrypting a license stored in a TRM area with both a public key of the reception side and a session key in such a manner that a third party cannot obtain the license and obtaining the encrypted license in the form of a conventional electronic file is referred to as offline license for encrypted file.

The TRM area stands for Tamper Resistant Module area. This area is an area for preventing data stored therein from being read from the outside. The detail will be described later.

In the following description, an offline license generation log for all offline licenses of each license is generated. An offline license generation log used to prevent a license that has been transferred from being stored again is referred to as LRL (License Revocation List).

Next, an embodiment of the present invention will be described.

Introduction of Offline License

As prior art of a license transferring system, USAC-MB is known.

In the UDAC-MB, a license is stored in the TRM area. When a license is transferred between the TRM areas, a secure connection prescribed in the UDAC-MB protocol is used.

According to the license transfer protocol prescribed in the UDAC-MB, it is necessary to transmit and receive several messages between the transfer side and the reception side. Thus, a license can be transferred only in online real time bidirectional communication environment. Thus, the license transferring system corresponding to the protocol is not suitable in the following cases:

Regular electronic data (such as a word document) is transmitted between users.

A license for a pay content is transferred between users.

Data is normally transferred between users off line. It is impractical to force users to make real time communications on line (since this method is inconvenient for users, it will not be popularized)

A pay content and a license are sold in pair with a record medium (such as CD).

When a license is sold on line, a distributing system corresponding to the UDAC-MB or a portable record medium corresponding to the UDAC-MB is essential.

A content is multicast (for example, a broadcast, etc.).

The transmission side one-sidedly transmits a content. The reception side one-sidedly receives a transmitted content.

When a license can be transferred between the TRMs, the license can be attached to electronic data and a pay content that is transferred in the off line environment. In addition, a license can be attached to one-way communication data such as a broadcast. Hereinafter, this license is referred to as offline license. (On the other hand, a license prescribed in the UDAC-MB is referred to as online license).

Online: A system that can completely transfer and distribute a license in one communication connection (such as socket).

Offline: A system that can transfer and distribute a license without a connection between the transmission side and the reception side. In other words, a license can be distributed as regular electronic data on a network or with a regular portable record medium.

Although an online license can be transferred with a portable record medium corresponding to the UDAC-MB, the online license cannot be handled in the format of regular electronic data.

Figure 3:
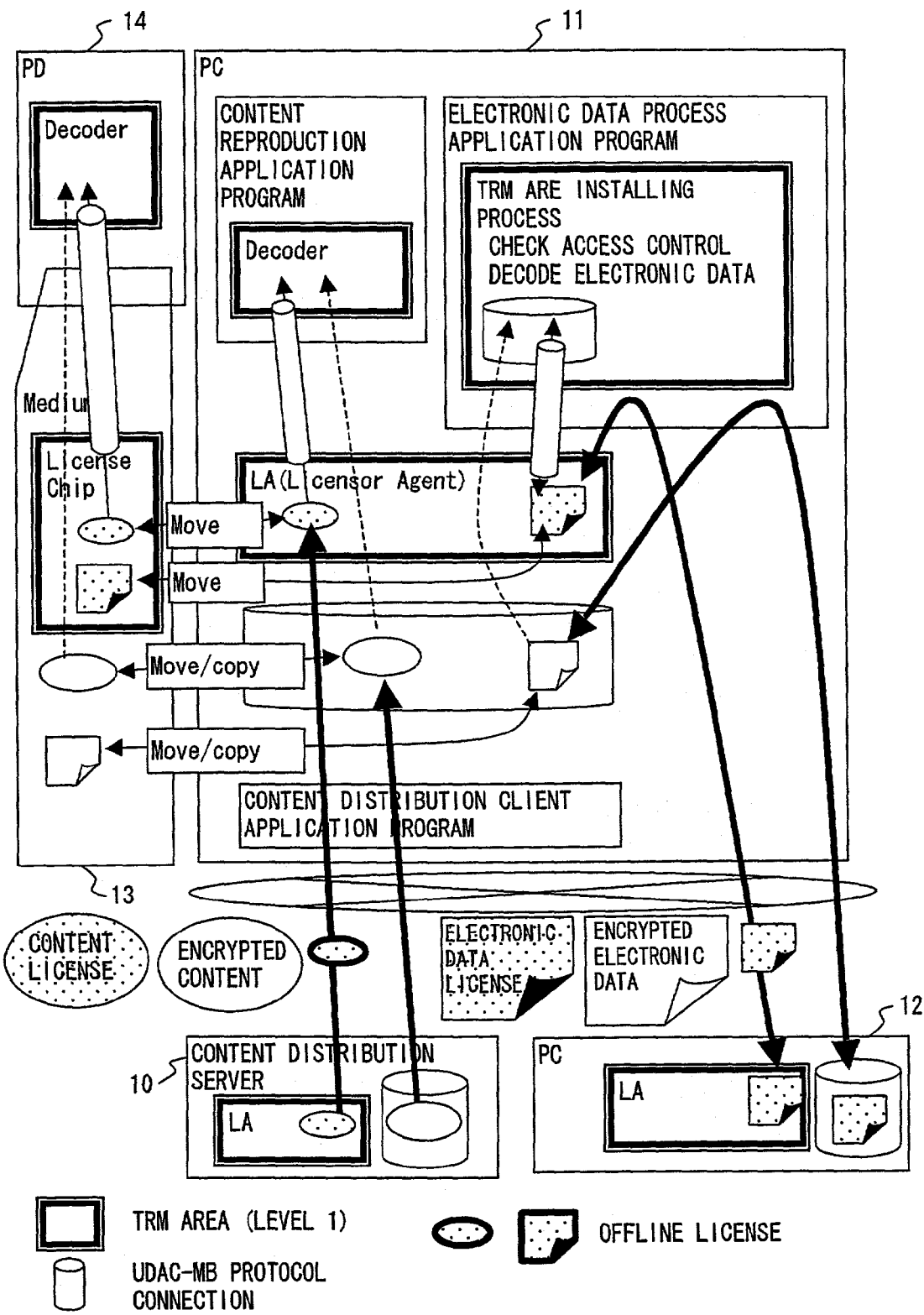
FIG. 3 is a schematic diagram showing the overall structure of an embodiment of the present invention.

FIG. 3 is a schematic diagram showing the overall structure of an embodiment of the present invention.

FIG. 3 shows the distributions of an offline license that has been generated and a content.

It is assumed that an LA (Licensor Agent or a license chip that is a chip of the LA) is disposed in each PC, a content distributing server, and a medium attached to a PD (Private Device or Portable Device). The LA will be described later.

With the LA of a content distributing server 10, a license for a content is transmitted. An encrypted content is stored to a record medium such as a hard disk of the content distributing server 10. The content distributing server 10 transmits the license for the content to the LA of a PC 11. In addition, the content distributing server 10 transmits the encrypted content to a record medium of the PC 11. A content reproducing application program of the PC 11 causes a decoder disposed in a TRM area to decrypt the encrypted content stored in the record medium using the license for the content received by the LA and reproduces the decrypted content. When the PC 11 receives electronic data such as an electronic document from a PC 12, the LA of the PC 11 receives a license for the electronic data from the LA of the PC 12. In addition, the PC 11 receives encrypted electronic data from the PC 12 and stores the received encrypted electronic data to the record medium. Thereafter, the PC 11 performs a TRM area installing process of an electronic data processing application program for the license for the electronic data and decrypts the encrypted electronic data with the license for the electronic data. The process for the license for the electronic data serves to check the control of the access and so forth. The LA of the PC 11 and the decoder of the content reproduction application program or the TRM area installing process of the electronic data process application program are communicated corresponding to the UDAC-MB protocol. Since the UDAC-MB protocol is known, although the description will be omitted, the details are described in Japanese patent application documents listed at the end of the section "Description of Preferred Embodiment".

When the encrypted content and the encrypted electronic data are moved from the PC 11 to a record medium 13 and the record medium 13 is attached to a PD 14, the PD 14 can use the content and the electronic data. In this case, the license chip is disposed on the record medium 13. Although the encrypted content and the encrypted electronic data can be normally moved or copied, the license for the content and the license for the electronic data are stored to the license chip disposed in the TRM area corresponding to the UDAC-MB protocol. The PD 14 decodes the encrypted content and the encrypted electronic data stored on the record medium 13 with the license for the content and the license for the electronic data obtained from the license chip corresponding to the UDAC-MB protocol. The decoder of the PD 14 is disposed in the TRM area. Thus, when the encrypted content and the encrypted electronic data are stored to the record medium 13, a licensed content can be distributed off line.

In FIG. 3, a content such as music data and electronic data such as an electronic document are separately described, they are substantially electronic files. Thus, in the following description, electronic data and a content are not distinguished, but used with the almost same meaning.

Figure 4:
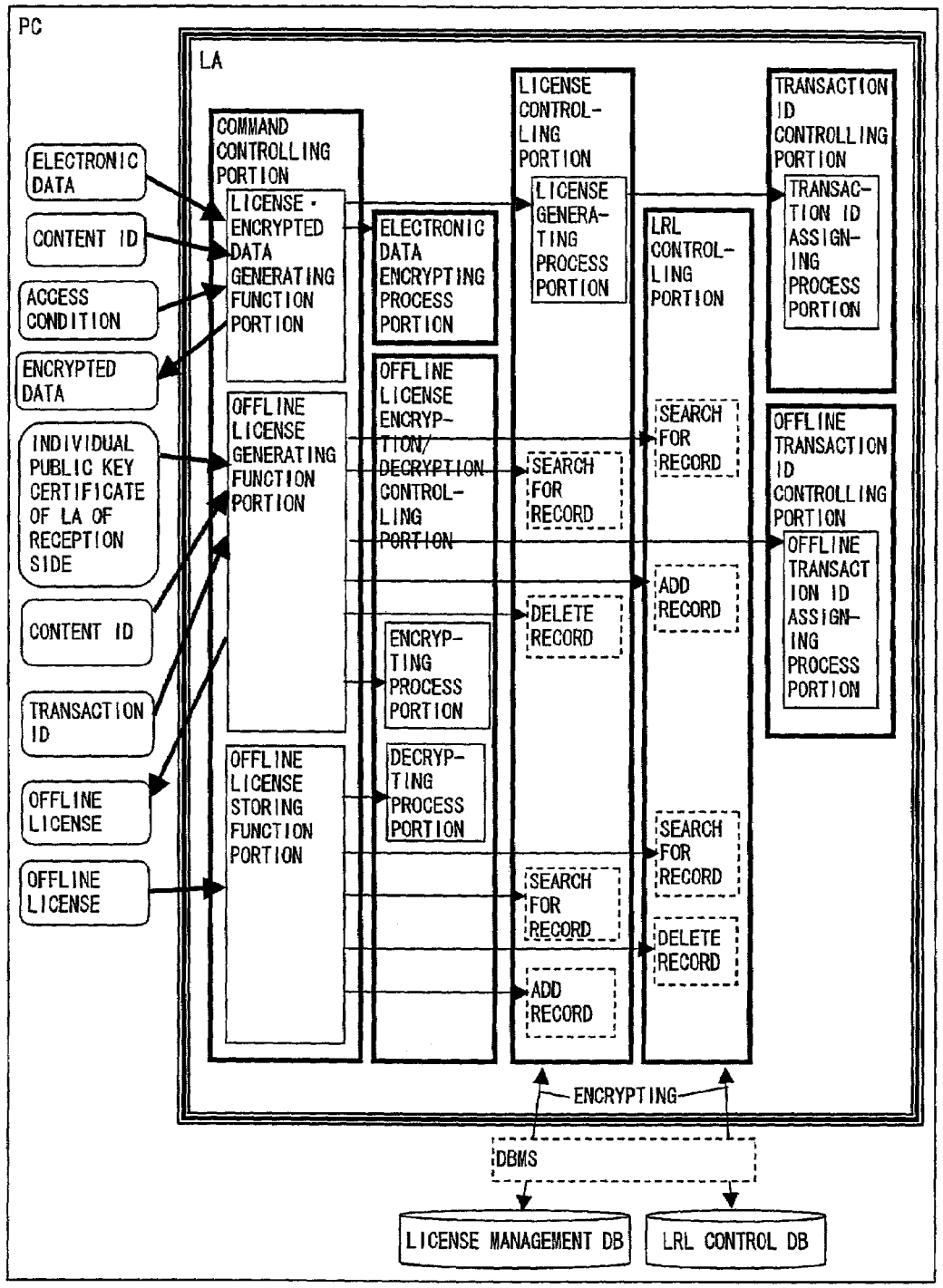
FIG. 4 is a schematic diagram for explaining a function of an LA (No. 1)
Figure 5:
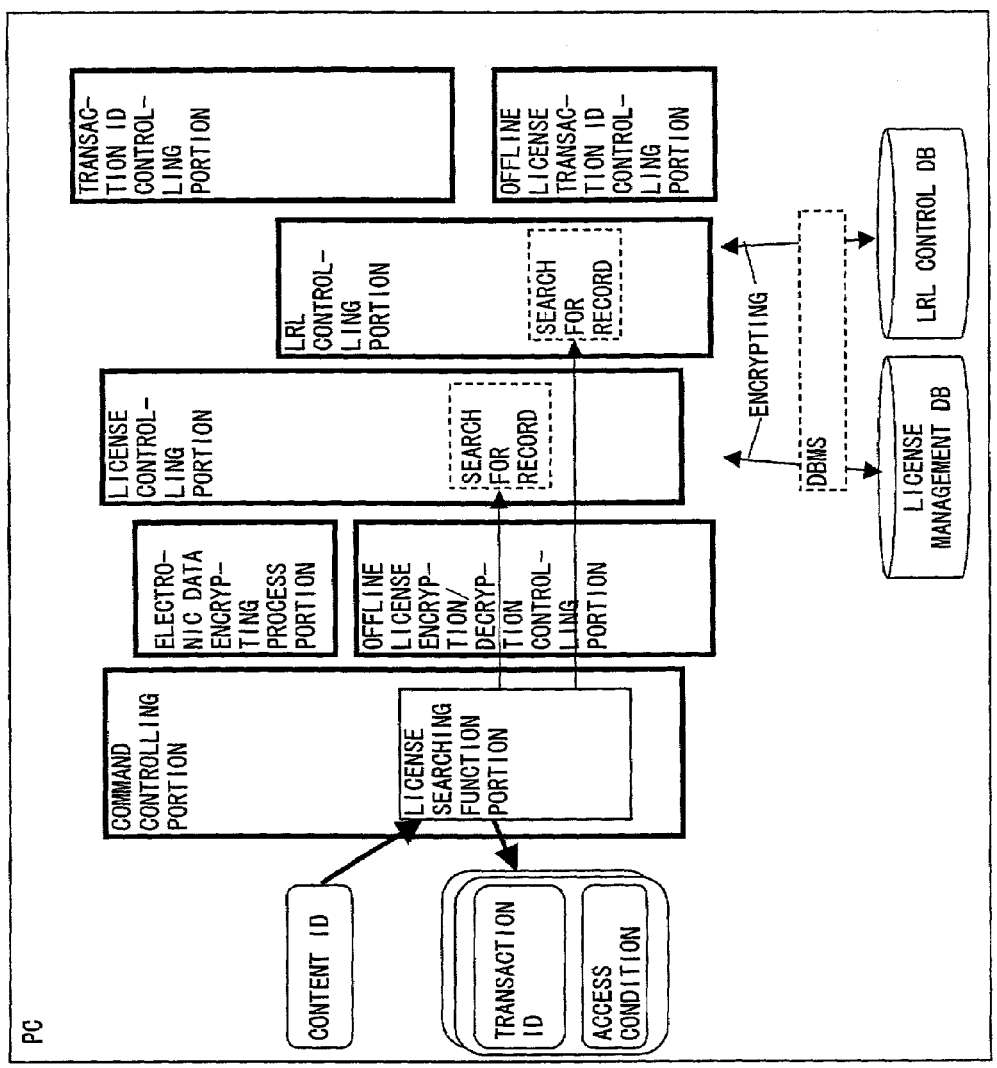
FIG. 5 is a schematic diagram for explaining a function of the LA (No. 2)

FIGS. 4 and 5 are schematic diagrams for explaining a function of the LA.

A license—encrypted data generating function portion of the LA inputs electronic data (content), a content ID, and an access condition. The license—encrypted data generating function portion requests an electronic data encrypting process portion to perform an encrypting process for the electronic data. The license—encrypted data generating function portion requests a license generating process portion to perform a generating process for a license. The license generating process portion requests a transaction ID assigning process portion of a transaction ID controlling portion to assign a unique transaction number for the license. As a result, the license—encrypted data generating function portion outputs encrypted data.

An offline license generating function portion inputs a reception side LA, an individual public key certificate, a content ID, and a transaction ID. The offline license generating function portion requests a license controlling portion and an LRL controlling portion to check and search for a license. When an offline license has been permitted, an offline transaction ID assigning process portion of an offline transaction ID controlling portion assigns a unique transaction ID for an offline license. A record is deleted from the license controlling portion. A record is added to the LRL controlling portion. As a result, an offline license is registered. After the offline license has been encrypted, the encrypted offline license is issued.

An offline license storing function portion inputs an offline license and performs a decrypting process for the offline license. The offline license storing function portion requests the license controlling portion and the LRL controlling portion to search for a record. When a record is obtained and the license is permitted, the record is deleted from the LRL controlling portion. A record is added to the license controlling portion. At that point, when the license controlling portion and the LRL controlling portion access a license management database and an LRL control database, respectively, the license controlling portion and the LRL controlling portion encrypt data and store those encrypted data into a DBMS (Database Management System).

In FIG. 5, a license searching function portion inputs a content ID. The license searching function portion requests a license controlling portion to search for a record with the content ID. In addition, the license searching function portion requests an LRL controlling portion to search for a record with the content ID. As a result, the license searching function portion obtains a transaction ID and an access condition.

FIG. 6 is a schematic diagram showing an outline of the structure of an offline license.

In FIG. 6, an offline license is composed of the following parts that are prescribed as follows.

Part 1: Session key encrypted by individual public key of LA of reception side

Part 2: The following data have been encrypted with session key.
   Subject name of individual public key certificate of LA of generation side (transmission side) of offline license
   offline license transaction ID
   Assigned by LA of generation side (transmission side) of offline license
   License (online license)
   Access condition in TRM of reception side
   Number of times of (period for) which offline license can be moved
   Others
   Access condition in TRM of content reproduction— electronic data processing system Part 3: Digital signature with class secret key of LA of generation side (transmission side) of offline license Part 4: Individual public key certificate of LA of generation side (transmission side) of offline license Part 5: Class public key certificate of LA of generation side (transmission side) of offline license Next, UDAC-PI (Protocol Independent) that is a modification of the UDAC-MB/LB and that is used to handle an offline license according to the embodiment of the present invention will be described.

Preconditions:

a) The license distribution side has a pair of an individual public key KPr and a secret key Kr.

b) In addition, the license distribution side has a certificate C (Kcr, KPr | Ir) of the KPr signed with a class secret key Kcr.

c) In addition, the license distribution side has a certificate C (Kar, KPcr || Iar) of a KPcr signed with a route secret key Kar.

d) The license reception side is a record medium, a license chip, or the TRM of an LA.

e) The TRM has a pair of an individual public key KPt and a secret key Kt.

f) The individual public key KPt is published as a certificate signed with a class secret key Kct.

g) A class public key KPct is published as a certificate signed with the route secret key Kat.

h) When there is no problem about risk, the authentication station for the Kar may be the same as the authentication station for the Kat. In addition, the Kar may be the same as the Kat.

When all certificates are searchable with LDAP (Lightweight Directory Access Protocol), users can be more easily handled.

Basic Procedure (1) The distribution side obtains a certificate of the KPt of the TRM of the reception side using a means such as the LDAP.

(2) The certificate of the KPt is checked with the KPct. The certificate of the KPct is checked with the KPat.

(3) The distribution side generates an offline license in the following format.

E (KPt, Ks) || E (Ks, SNr || Transaction ID || Kc || ACt || ACp || Is) || E (Kcr, H (all plain text) || C (Kcr, KPr || Ir) || C (Kar, KPcr || Iar)

where

Ks: session key

SNr: subject name of certificate of individual public key KPr of distribution side Transaction ID: License serial number. The distribution side generates a unique number for each license.

Kc: content key

ACt: access condition in TRM of reception side. The format of the ACt is the same as the format of the ACm. Alternatively, the format of the ACt is an extended format of the ACm.

ACp: access condition in TRM of reproducing system

Is: other information

H (x): hash value of x

C (Kx, KPy): certificate of which the public key KPy is signed with the secret key Kx.

||: meaning that the left side and the right side are simply connected.

(4) The distribution side transmits a license and an encrypted content to the TRM of the reception side.

(5) The license is decrypted in the TRM of the reception side. The validity of the license is checked with the hash and the certificate.

(6) It is checked whether or not the SNr and the transaction ID are in a license revocation list (LRL) in the TRM of the reception side. When they are in the LRL, the process is terminated.

(7) The license is stored to a license entry in the TRM of the reception side.

(8) The protocols and procedures for moving the license and reproducing the content are same as those of the UDAC-MB/LB (refer to the description in the Japanese patent application documents listed in the section "Description of Preferred Embodiment").

The generation of an offline license with an online license (making offline license) and the storage of an offline license (making online license) are accomplished by the function of the LA (Licensor Agent). In other words, an offline license is transferred between the LAs.

The related functions of the offline license of the LA are as follows:

Function for obtaining license information (content ID, transaction ID, access condition, . . . etc.)

Obtain all license information.

Obtain all license information with respect to the relevant content ID.

Function for generating offline license.

Generate an offline license with an individual public key certificate of the LA of the reception side and an online license (content ID and transaction ID).

Store an offline license.

Store a designated offline license to the license management database of the LA so as to generate an online license.

TRM area installing process using content reproducing application program and electronic data processing application program The content reproducing application and the electronic data processing application cause a sequence of processes (UDAC-MB protocol installing process portion) to be installed to the TRM area.

Function for obtaining an online license from LA (or license chip) (corresponding to the UDAC-MB protocol).

Function for decrypting encrypted content data with an online license.

Function for reproducing a content and processing data

Various Types of Public Key Certificates

A secret key, a class public key certificate, an authenticated station route public key certificate corresponding to an individual public key certificate of the LA are placed in a product (package) by the producer so that they are expanded in the TRM area. In addition, the LA has a function for outputting its individual public key certificate.

When the user sends an individual public key certificate of his or her LA to the transmission side of the offline license, the certificate is obtained using that function.

Next, conventional technologies used in the embodiment of the present invention will be described.

TRM (Tamper Resistant Module)

A technology that prevents a process being performed and data being processed from being extracted and/or inferred from the outside. In addition, TRM means a semiconductor chip or a program that uses such a technology.

A semiconductor chip that uses the TRM technology is referred to as hardware TRM. In contrast, a program that uses the TRM technology is referred to as software TRM. According to the embodiment of the present invention, any of the hardware TRM and the software TRM can be used.

1) Hardware TRM

The hardware TRM can be accomplished by the following technology.

Prohibit secret information from being read and rewritten from an external terminal. The controlling firmware, log information, access control information, and so forth are formed so that they cannot be written.

Sealed by metal layer, special coating, and mesh sensor.

Use an ultra fine structure.

2) Software TRM

The software TRM is accomplished by the following technologies:

Separate an area for a program process from data area and disperse them in memory so as to prevent data from being analyzed.

Encrypt a load module. Decrypt the load module only when it is executed.

Vary the mapped structure of the program in the memory space.

Next, the embodiment of the present invention will be further described.

Figure 7:
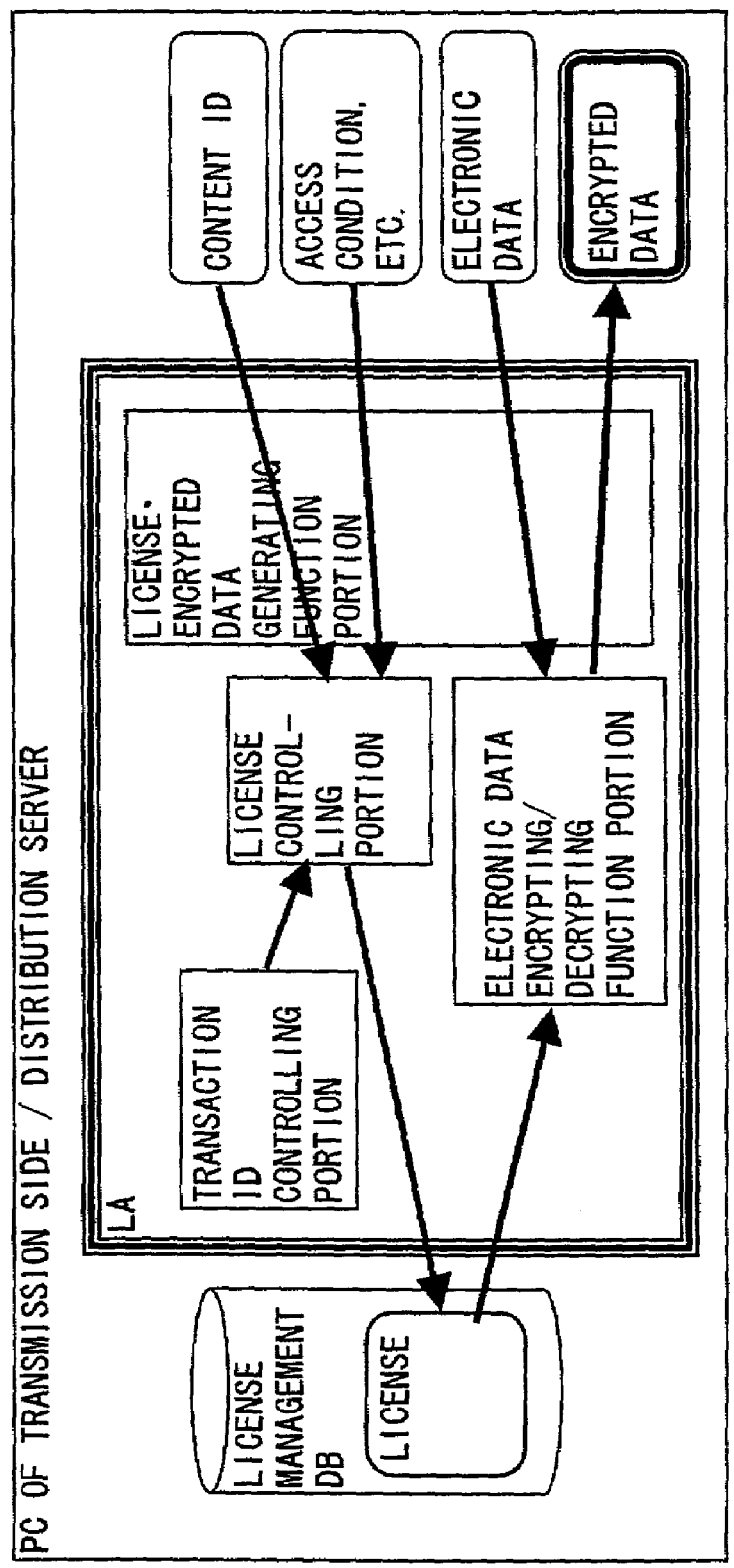
FIG. 7 is a schematic diagram for explaining the generation of an offline license and encrypted data.

FIG. 7 is a schematic diagram for explaining the generation of a new license and encrypted data.

When the PC of the transmission side or the distribution server receives a content ID, an access condition, and so forth with the license controlling portion of the LA, the transaction ID controlling portion assigns a transaction ID to a license. The license is stored to the license management database. The electronic data encrypting/decrypting function portion uses the license to encrypt electronic data.

License Management Database

A database that stores a license. In reality, the license management database may be a DBMS (Database Management System) or a file.

FIG. 8 is a schematic diagram showing the structure of a record of the license management database.

Description of Each Field

Time Stamp 1 and Time Stamp 2

Time stamps placed when a record is generated. The LA determines whether or not the time stamp 1 matches the time stamp 2. When they match, the LA determines that the record has been stored to the file. In reality, when the license management database is composed of a DBMS, since the admissity of the database is assured by the DBMS, these time stamps are omissible.

Content ID

A content ID of a content corresponding to a license.

Transaction ID

A transaction ID contained in a license.

A license can be uniquely identified with a content ID and a transaction ID.

Encryption License

A license that has been encrypted. A license is encrypted with a secret key of the LA. (For example, T-DES is used.) A secret key of the LA is stored in the TRM area so that the secret key cannot be accessed by other people.

Subject Name of Public Key Certificate of Transmission Side

A subject name of a public key certificate of an LA of a transmission side that transmits an offline license. When a license is transmitted corresponding to the UDAC-MB protocol (on line), this field is zero cleared.

Offline Transaction ID 1

When a license is transmitted to the relevant LA in the form of an offline license, an offline transaction ID assigned by the LA of the generation side of the offline license is stored in this field. The offline transaction ID is a unique number assigned by the LA of the generation side of the offline license. An offline license can be uniquely identified with the subject name of the public key certificate of transmission side and the offline transaction ID. When a license is transmitted corresponding to the UDAC-MB protocol (on line), this field is zero cleared.

FIG. 9 is a schematic diagram showing a process for generating an offline license (making offline license).

In the PC of the transmission side/the distribution server, a content ID and a transaction ID are input to the LRL controlling portion and the license controlling portion of the LA. The LRL controlling portion references the LRL control database. The license controlling portion references a license of the license management database. The LRL controlling portion performs the process in communication with the license controlling portion. The processed result of the license controlling portion is supplied to the LRL controlling portion. In addition, the transaction ID is supplied from the offline transaction ID controlling portion to the LRL controlling portion. Moreover, a license encrypting request is sent from the LRL controlling portion to the offline license encryption/decryption controlling portion. The offline license encryption/decryption controlling portion outputs an encrypted offline license.

Offline Transaction ID Controlling Portion

Now, it is assumed that an LA of a particular PC (hereinafter, the LA is referred to as LA 1) generates an offline license so as to transfer a license and that the offline license is finally returned to the LA 1. When a license that has been transferred from the LA 1 is mistakenly or illegally tried to be stored to the LA 1, the license should be prevented from being stored to the LA 1. However, since the license may be legally tried to be returned to the LA 1, it is improper to unconditionally remove the license.

To allow such a license to be distinguished, when an offline license is generated, the offline transaction ID controlling portion newly assigns a unique ID in the LA.

LRL (License Revocation List) Controlling Portion

When an offline license is generated, the license in the LA is removed (deleted). In this case, to prevent the same license from being stored to the LA, license information (subject name of individual public key certificate of transmission side, offline license ID, and so forth) that represents that the offline license has been generated is stored and managed.

To distribute a license, the distribution server generates an offline license. In this case, the distribution server does not receive any offline license. Thus, generally, the distribution server need not have the LRL controlling portion.

Figure 10:
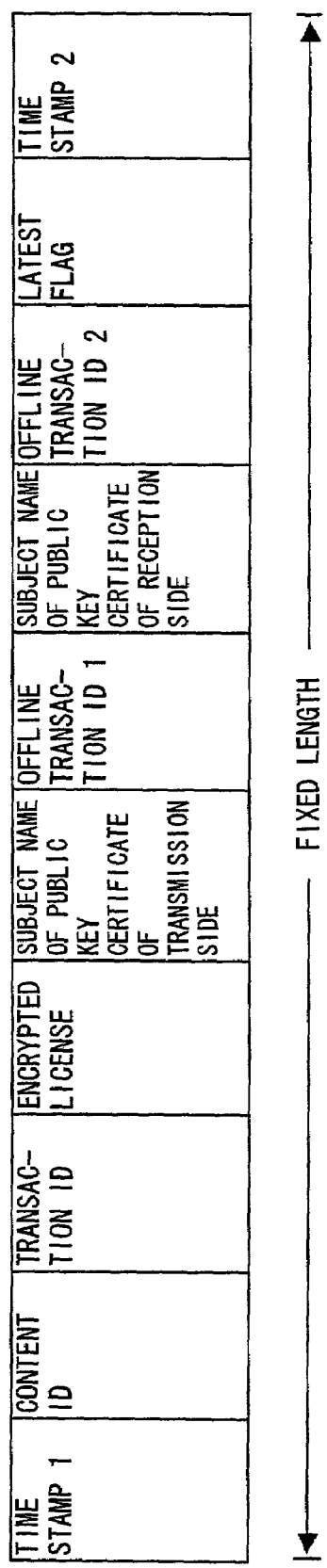
FIG. 10 is a schematic diagram showing the structure of a record of an LRL (License Revocation List) control database.

FIG. 10 is a schematic diagram showing fields of a record of the LRL (License Revocation List) control database.

The fields of a record of the LRL control database are the same as those of the license management database except for the following fields.

Subject name of public key certificate of reception side:

A subject name of a public key certificate of an LA of the reception side when the LA generates an offline license.

Offline Transaction ID 2:

An offline transaction ID assigned when the LA generates an offline license.

Latest flag:

A flag that represents the latest generated offline license corresponding to each license (online license).

On: Latest Off: not Latest

When an offline license is generated again, information of a record whose latest flag field is ON is used.

Input Parameters

Individual public key certificate of LA of reception side

Content ID

Transaction ID

The user pre-obtains a content ID and a transaction ID of a license with which an offline license is generated using the license displaying function portion.

However, information about a product corresponding to a license may be managed by a dedicated tool or by the user.

Figure 11:
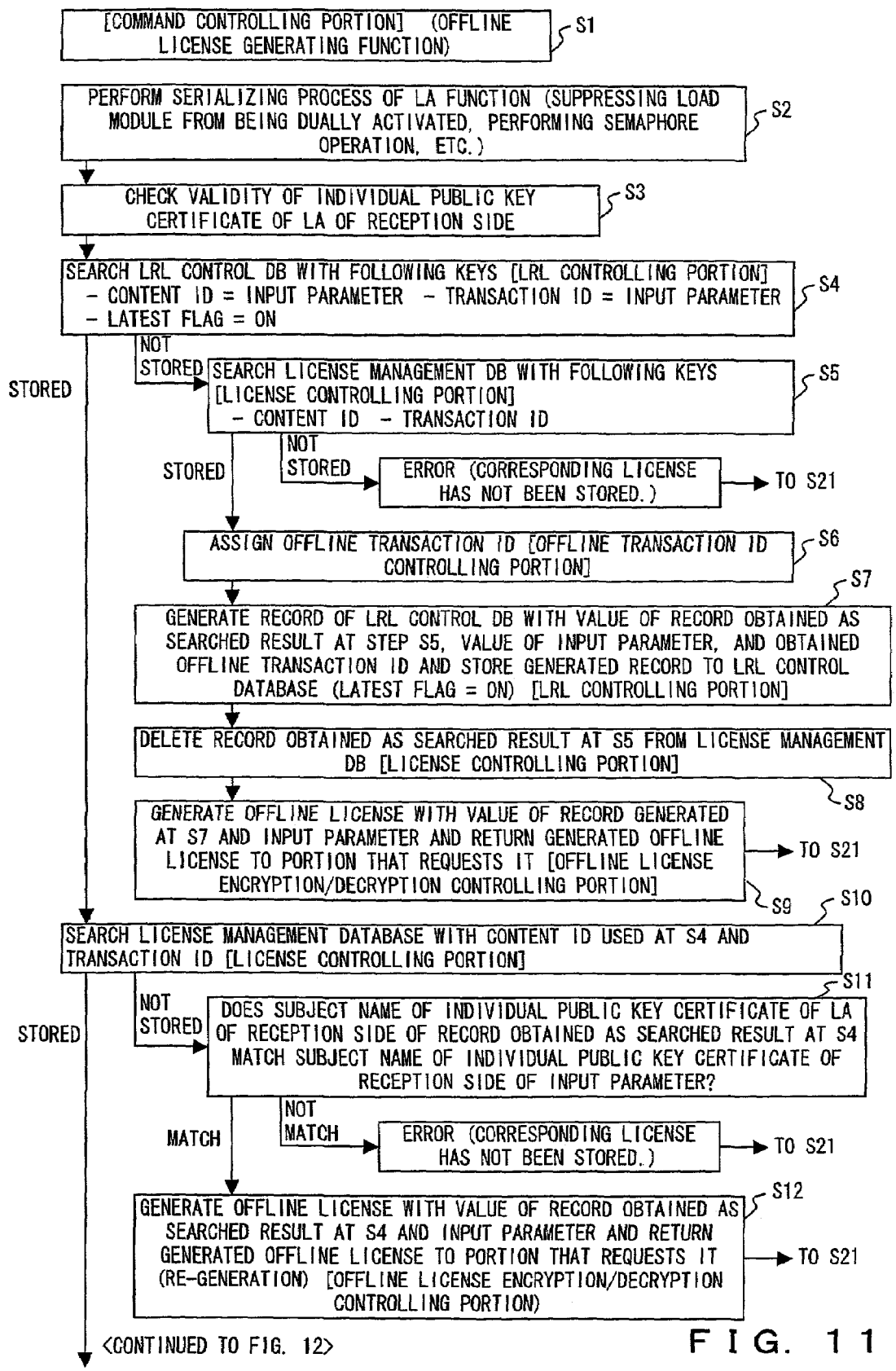
FIG. 11 is a flow chart for explaining an offline license generating process (No. 1)
Figure 12:
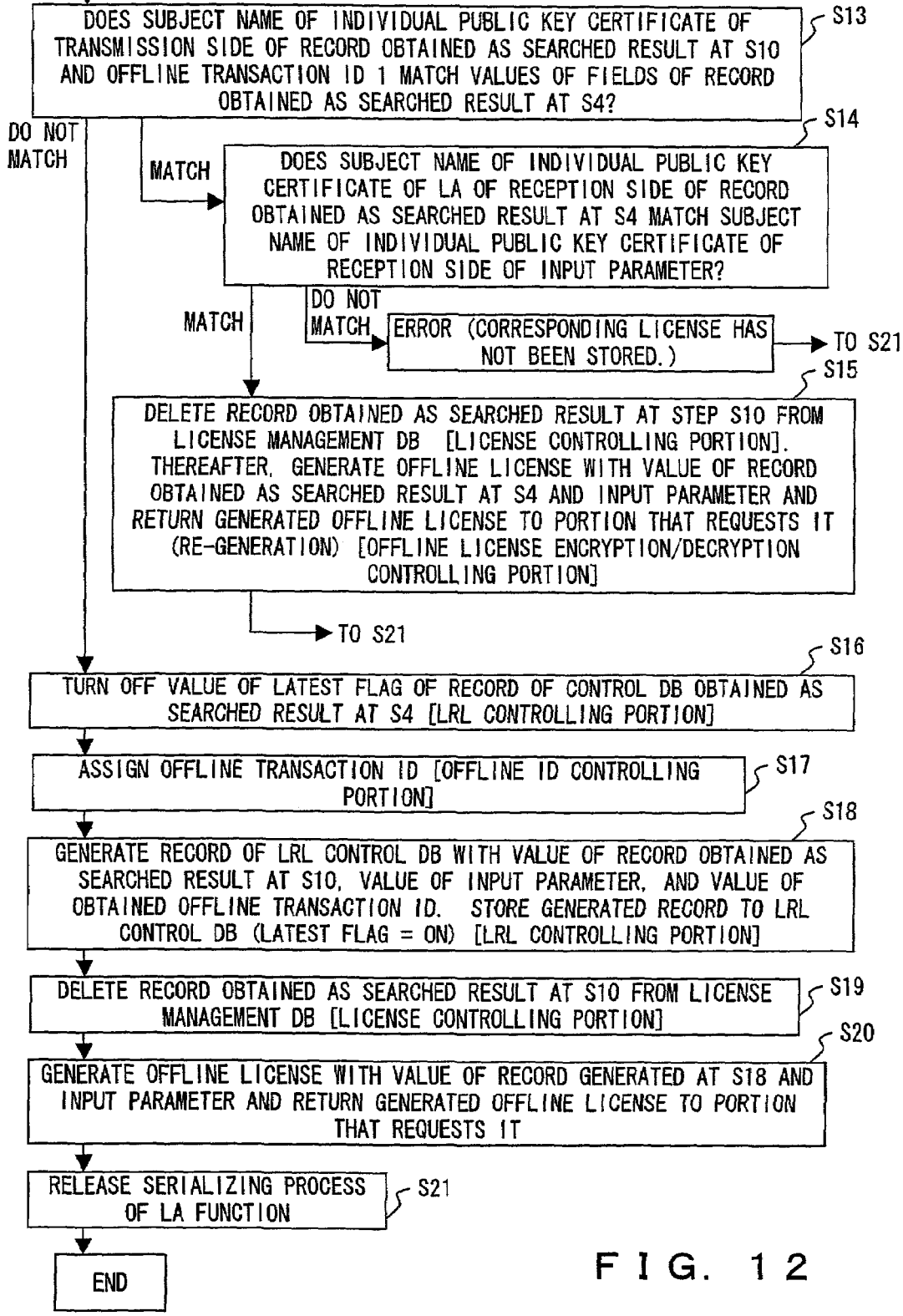
FIG. 12 is a flow chart for explaining an offline license generating process (No. 2)

FIG. 11 and FIG. 12 are flow charts for explaining the operation of the LA.

At step S1, the command controlling portion activates the offline license generating function. At step S2, a serializing process (suppressing the load module from being dually activated, performing a semaphore operation, and so forth) is performed. At step S3, the validity of the individual public key certificate of the LA of the reception side is checked.

Thereafter, at step S4, the LRL controlling portion searches the LRL control database with the following keys.

Content ID=input parameter

Transaction ID=input parameter

Latest flag=ON

When a license whose latest flag is ON is not stored in the database, the license controlling portion searches the license management database with the following keys (at step S5).

Content ID

Transaction ID

When the searched result represents that the corresponding license is not stored in the license management database, the license controlling portion performs an error process. Thereafter, the flow advances to step S21. When the searched result represents that the corresponding license is stored in the license management database, the offline transaction ID controlling portion assigns an offline transaction ID (at step S6). At step S7, the LRL controlling portion generates a record of the LRL control database with the value of the record obtained as the searched result at step S5, the value of the input parameter, and the offline transaction ID, sets the latest flag of the record to ON, and stores the record to the LRL control database. At step S8, the license controlling portion deletes the record obtained as the searched result at step S5 from the license management database. At step S9, the offline license encryption/decryption controlling portion generates an offline license with the value of the record generated at step S7 and the input parameter. Thereafter, the flow advances to step S21.

When the determined result at step S4 represents that there is the corresponding license, the flow advances to step S10. At step S10, the license controlling portion searches the license management database with the content ID and the transaction ID used at step S4. When there is no corresponding license, the flow advances to step S11. At step S11, it is determined whether or not the subject name of the individual public key certificate of the LA of the reception side of the record obtained as the searched result at step S4 matches the subject name of the individual public key certificate of the reception side of the input parameter. When the determined result represents that they do not match, an error of which there is no corresponding license takes place. Thereafter, the flow advances to step S21. When the determined result at step S11 represents that they match, the flow advances to step S12. At step S12, the offline license encryption/decryption controlling portion generates an offline license with the value of the record obtained as the searched result at step S4 and the input parameter and returns the generated offline license to the portion that requests it. Thereafter, the flow advances to step S21.

When the determined result at step S10 represents that there is the corresponding license, the flow advances to step S13 shown in FIG. 12. At step S13, it is determined whether or not the subject name of the individual public key certificate of the transmission side of the record obtained as the searched result at step S10 and the offline transaction ID 1 match the respective fields of the record obtained as the searched result at step S4. When they match, the flow advances to step S14. At step S14, it is determined whether or not the subject name of the individual public key certificate of the LA of the reception side of the record obtained as the searched result at step S4 matches the subject name of the individual public key certificate of the reception side of the input parameter. When the determined result at step S14 represents that they do not match, an error representing that there is no corresponding license takes place. Thereafter, the flow advances to step S21. When the determined result at step S14 represents that they match, the flow advances to step S15. At step S15, unless the subject name of the individual public key certificate of the transmission side of the record of the license management database obtained as the searched result at step S10 is all zero, the license controlling portion deletes the record. Thereafter, the offline license encryption/decryption controlling portion generates an offline license with the value of the record obtained as the searched result at step S4 and the input parameter and returns the generated offline license to the portion that requests it. Thereafter, the flow advances to step S21.

When the determined result at step S13 represents that they do not match, the flow advances to step S16. At step S16, the LRL controlling portion turns off the value of the latest flag of the record obtained as the searched result at step S17 of the LRL control database. At step S17, the offline transaction ID controlling portion assigns an offline transaction ID. At step S18, the LRL controlling portion generates a record of the LRL control database with the value of the record obtained as the searched result at step S10 and the value of the offline transaction ID. The LRL controlling portion stores the generated record to the LRL control database (sets the latest flag to ON). At step S19, the license controlling portion deletes the record of the license management database obtained as the searched result at step S10. At step S20, the offline license encryption/decryption controlling portion generates an offline license with the value of the record generated at step S18 and the input parameter and returns the offline license to the portion that requests it. Thereafter, the flow advances to step S21.

At step S21, the serializing process of the LA is completed.

When there is the corresponding record in the license management database at step S5 and step S10, the encrypted license of the record is decrypted. When the values of the content ID and the transaction ID do not match the values designated with the search keys, it is determined that the license management database has been forged. As a result, the process is terminated with an error.

When there is the corresponding record in the LRL control database at step S4, the encrypted license of the record is decrypted. When the values of the content ID and the transaction ID do not match the values designated by the record search keys, it is determined that the LRL control database has been forged. As a result, the process is terminated with an error.

At step S9, the offline license generating process portion decrypts the encrypted license of the record obtained as the searched result at step S5 with a secret key in the LA and generates an offline license with the decrypted result.

At steps S12 and S15, the offline license generating process portion decrypts the encrypted license of the record obtained as the searched result at step S4 with a secret key in the LA and generates an offline license with the decrypted result.

At step S20, the offline license generating process portion decrypts the encrypted license of the record obtained as the searched result at step S10 with a secret key in the LA. The offline license generating process portion generates an offline license with the decrypted result.

Figure 13:
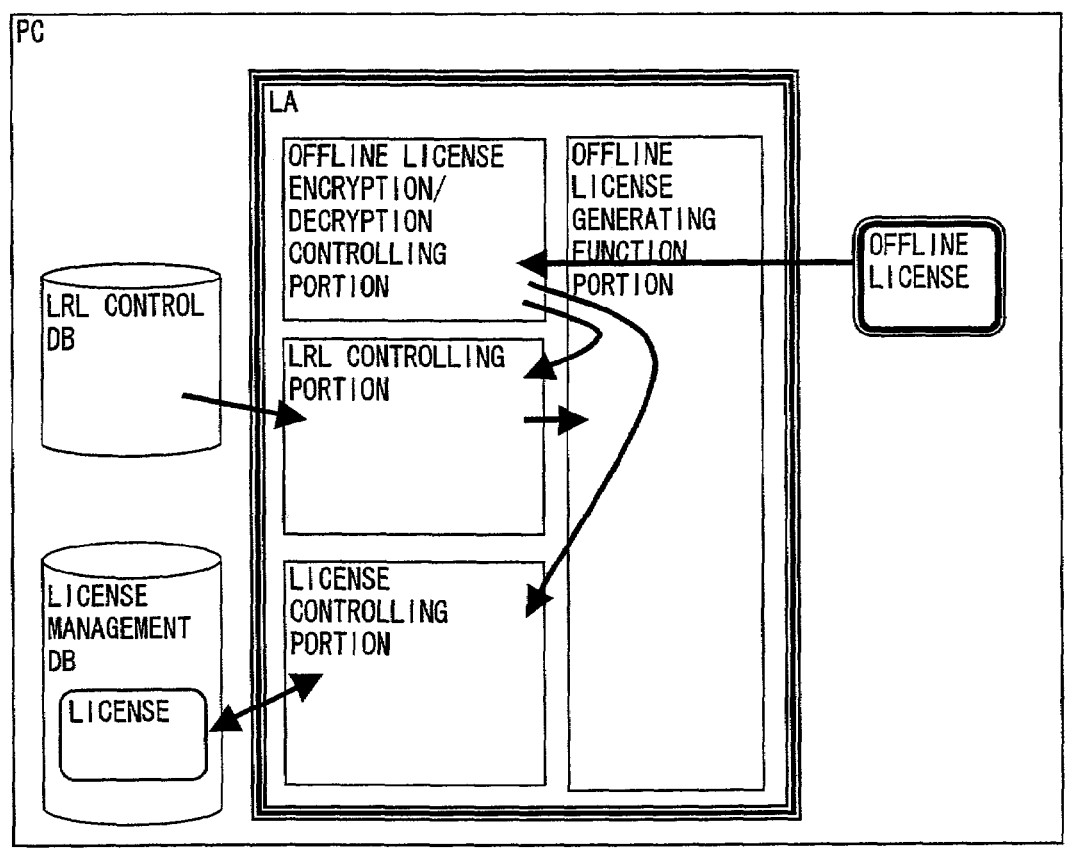
FIG. 13 is a schematic diagram for explaining an offline license storing process (making online license)

FIG. 13 is a schematic diagram for explaining a process for storing an offline license (making online license).

Input Parameter
Offline license
LRL Controlling Portion

When an offline license is stored, the LRL controlling portion obtains information about an offline license that has been generated (subject name of individual public key certificate of transmission side, offline license ID, and so forth). The LRL controlling portion determines whether or not the offline license has been stored. When the offline license has been stored to the LRL management database, an error takes place.

License Controlling Portion

Unless the offline license has been stored to the LRL management database, the license controlling portion determines whether or not the corresponding license (online license) has been registered. The license controlling portion searches the license management database for the license. When the license management database stores a record of the license corresponding to the offline license, an error takes place.

Figure 14:
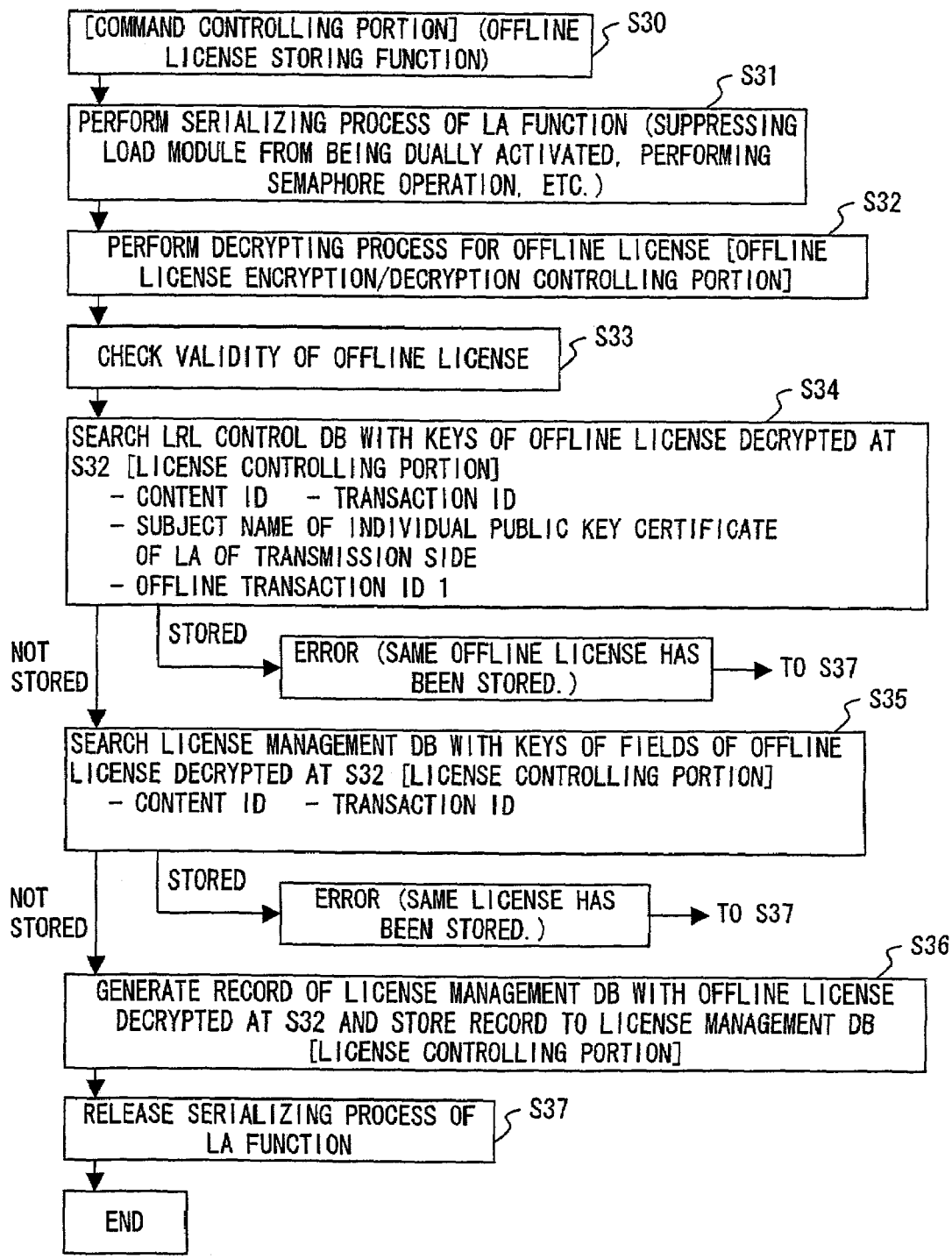
FIG. 14 is a flow chart showing an offline license storing process.

FIG. 14 is a flow chart showing a process for storing an online license.

At step S30, the command controlling portion activates the offline license storing function. At step S31, the serializing process (suppressing the load module from being dually activated, performing the semaphore operation, and so forth) of the LA function is performed.

At step S32, the offline license encryption/decryption controlling portion perform a decrypting process for an offline license. At step S33, the validity of the offline license is checked. At step S34, the LRL controlling portion searches the LRL control database with keys of the following fields of the offline license decrypted at step S32.
  Content ID
  Transaction ID
  Subject name of individual public key certificate of LA of transmission side
  Offline transaction ID 1

When the LRL control database stores the corresponding offline license, an error that represents that the same offline license has been stored takes place. At that point, the flow advances to step S37.

When the determined result at step S34 represents that the LRL control database does not stores the corresponding license, the flow advances to step S35. At step S35, the license controlling portion searches the license management database with keys of the following fields of the offline license decrypted at step S32.
  Content ID
  Transaction ID When the determined result at step S35 represents that license management database stores the corresponding license, an error that represents that the same license has been registered takes place. At that point, the flow advances to step S37.

When the determined result at step S35 represents that the license management database does not store the corresponding license, the flow advances to step S36. At step S36, the license controlling portion generates a record of the license management database with the offline license decrypted at step S32 and stores the generated record to the license management database. Thereafter, at step S37, the serializing is released and the process of the LA function is completed.

When the determined result at step S35 represents that the license management database stores the corresponding record, the encrypted license of the record is decrypted.

When the values of the content ID and the transaction ID match the values designated by the record search keys, it is determined that the license management database has been forged. At that point, the process is terminated with an error.

When the determined result at step S34 represents that the LRL control database stores the corresponding record, the encrypted license of the record is decrypted. When the values of the content ID and the transaction ID do not match the values designated by the record search keys, it is determined that the LRL control database has been forged. At that point, the process is terminated with an error.

When a record of the license management database is generated at step S36, a license of which the offline license has been decrypted is encrypted with a secret key of the LA. The generated encrypted license is embedded in the record.

Next, a license searching function will be described.

Outline of Function

Obtaining Information of All Licenses

The following information is obtained for all licenses.

Content ID, transaction ID, subject name of individual public key certificate of transmission side (when stored with offline license), access condition, data representing whether or not offline license has been generated When the offline license has been generated, the following information is added.

Subject name of individual public key certificate of reception side

Searching for License with Content ID

Information about a license corresponding to designated content ID is obtained. The fields of the information are the same as those of the above-described information.

Outline of System

With reference to records of the license management database and the LRL control database, the information is output.

1) The records are read from the license management database.

2) The LRL control database is searched for a record whose latest flag is ON and whose fields are the same as those of the record referenced in 1).

Content ID, Transaction ID

When the LRL control database does not store the corresponding record, a record of the license management database is output. When the LRL control database stores the corresponding record, since the offline license has been generated, additional information is output.

3) The LRL control database is searched for a record whose latest flag is ON and that does not match the record obtained as the searched result in 2). When the corresponding record is obtained, information that represents that the offline license has been generated is output.

Consistency with Operation of Online License

When an online license is transferred corresponding to the UDAC-MB protocol, the LA of the reception side performs the following process.

1) The LRL control database is searched for a record with the following keys.

Content ID=content ID of offline license

Transaction ID=transaction ID of online license

Latest flag=ON

When the LRL control database stores the corresponding record, the latest flag of the record is set to OFF.

2) The online license is stored to the license control database. At that point, the values of the following field are cleared to zero.

Subject name of individual public key certificate of LA of transmission side

Offline transaction ID 1

This control, the offline license storing function portion, and the offline license generating function portion prevent a license from being unreasonably invalidated and a license from being illegally copied even if an offline license and an online license are transferred at a time and an offline license and an online license are generated with one license.

Countermeasure Against Destruction of Disk Area of LA (Software)

When the disk area of the LA is destroyed, the user should re-install the LA. However, in this case, if the user repeatedly generates an offline license, re-installs the LA, stores the offline license, and generates the offline license, a plurality of licenses are generated with one license.

To prevent such a situation, whenever the LA is installed, a pair of an individual public key certificate and a secret key corresponding thereto are changed.

The producer of the LA prepares several key spares for one user and requests an authentication station to issue certificates for the individual public key spares.

Before shipping the LA, the producer embeds the key spares and the public key certificates to the product in such a manner that the user can install the LA to the product one time.

When the user re-installs the LA to the product, he or she should request a new package in which a key spare has been embedded to the seller (producer) and receives the new package from the seller through the Internet or the like.

Alternatively, using the install program of the LA, the user can receive a key pair from the server of the producer. In this case, the risk on security becomes large.

Next, examples of an offline license used for the distribution of an electronic document will be described.

Conventionally, the UDAC-MB deals with an online license. To distribute a license on a network, the transferring function should have the UDAC-MB transfer protocol. Thus, a license cannot be transferred using a commercially available software program.

In contrast, an offline license can be transferred using a commercially available software program.

Figure 15:
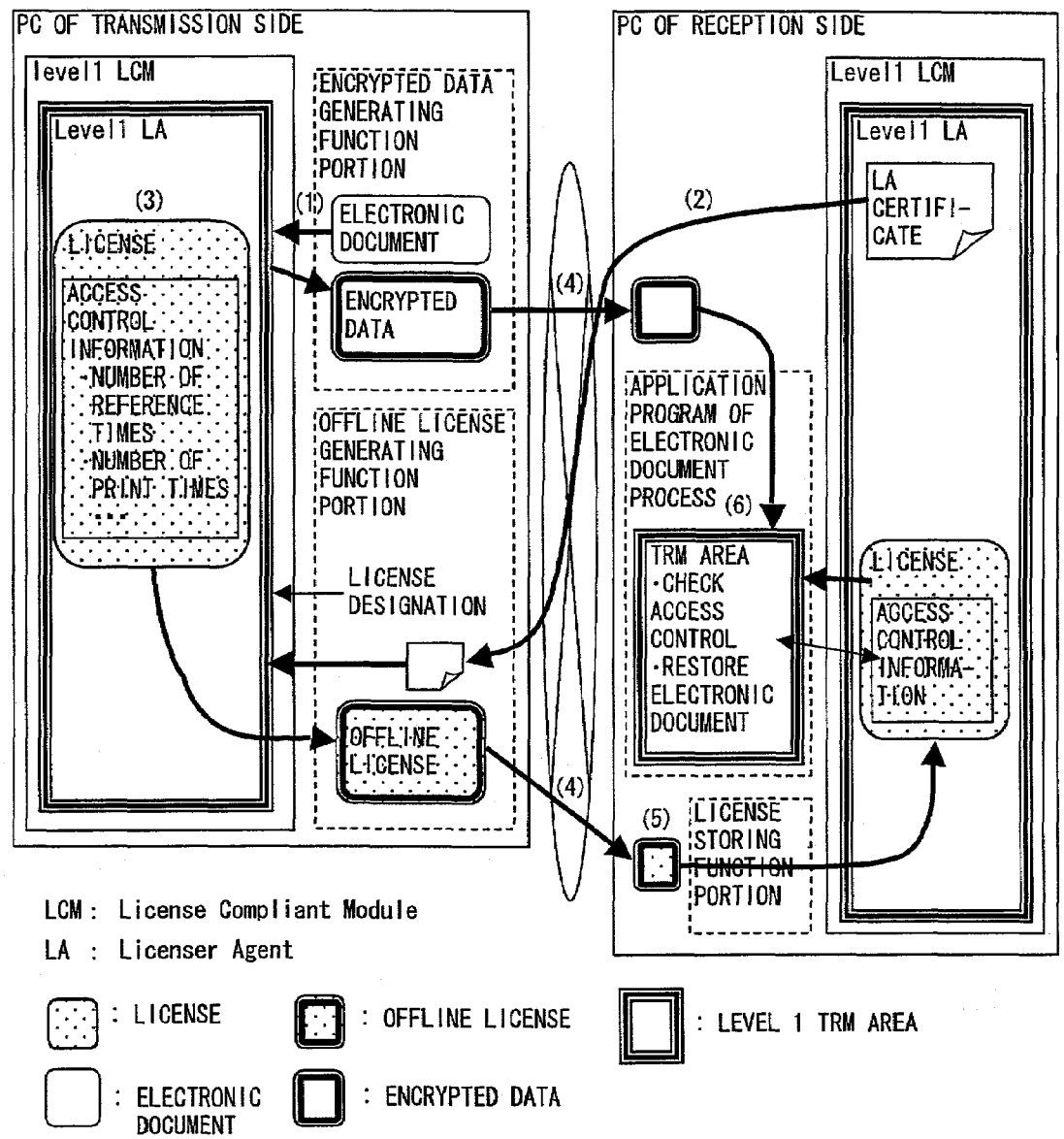
FIG. 15 is a schematic diagram showing an outline of an electronic document distribution using an offline license.

FIG. 15 is a schematic diagram showing an outline of the distribution of an electronic document using an offline license.

Next, the case that a creator transmits an electronic document he or she created and permits the reception side to reference the electronic document will be described.

(1) Transmission Side (Creator of Electronic Document):

A license and encrypted data are generated with the created electronic document through the LCM (License Compliant Module). At that point, the creator of the electronic document designates access control information.

License for Permitting the Reception Side to Reference the Electronic Document

A secret key for decrypting an electronic document.

Access control information such as number of reference times and number of print times is added to the license.

The license is stored in the LA. Unless the TRM is destroyed, the license cannot be extracted.

Encrypted Data

An electronic document that has been encrypted with the license.

SCDF format (Super Content Distribution Format)

(2) Transmission Side, Reception Side:

The transmission side receives a public key certificate of an LA from a user of the reception side who received an electronic document.

(3) Transmission Side:

With the public key certificate of the reception side obtained in (2) and the license generated in (1), the transmission side generates an offline license using the function of the LCM.

An offline license is composed of a license that has been encrypted with a secret key generated by the LA of the transmission side and data of which the secret key has been encrypted with a public key of the reception side. An offline license can be transferred on a network.

However, the attack resistance of an offline license can be adjusted by multiplexing keys. In reality, the number of keys for the attack resistance are decided by concerned people.

(4) Transmission Side, Reception Side:

The offline license of the transmission side and the encrypted data are transmitted to the reception side.

The offline license and the encrypted data can be transmitted by any means (for example, a network or a portable record medium).

(5) Reception Side:

The offline license is stored to the TRM area using the function of the LCM.

(6) Reception Side:

By designating the encrypted data and the license corresponding thereto, an electronic document processing application program corresponding to the UDAC is executed.

The secret key of the LA is stored in the TRM area. In addition, the offline license is stored in the TRM area. Thus, the electronic document transmitted to the reception side cannot be copied (unless the TRM is destroyed or the secret key of the LA is extracted).

Figure 16:
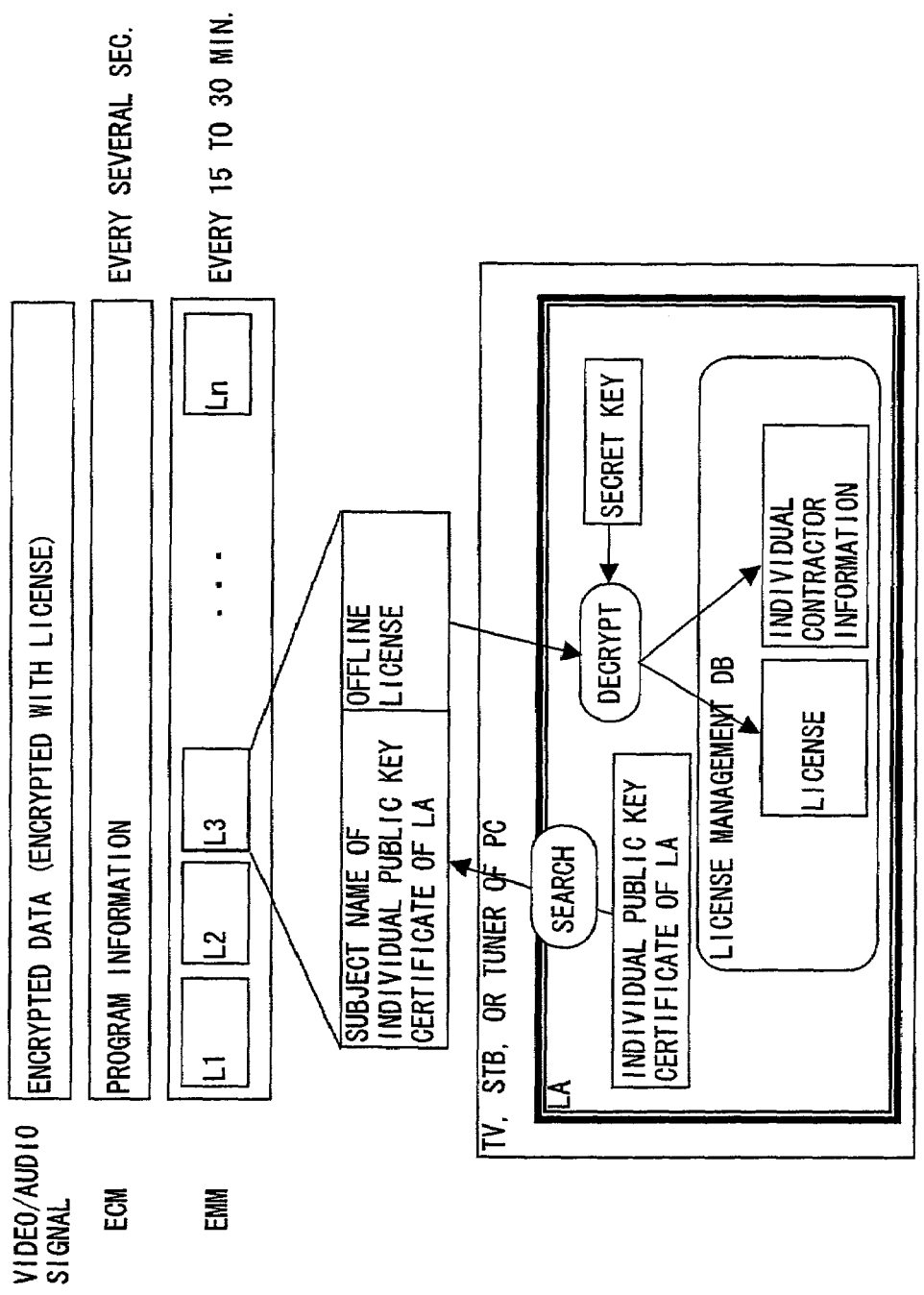
FIG. 16 is a schematic diagram showing an example of which an offline license is applied to a multicast (broadcast) (No. 1)
Figure 17:
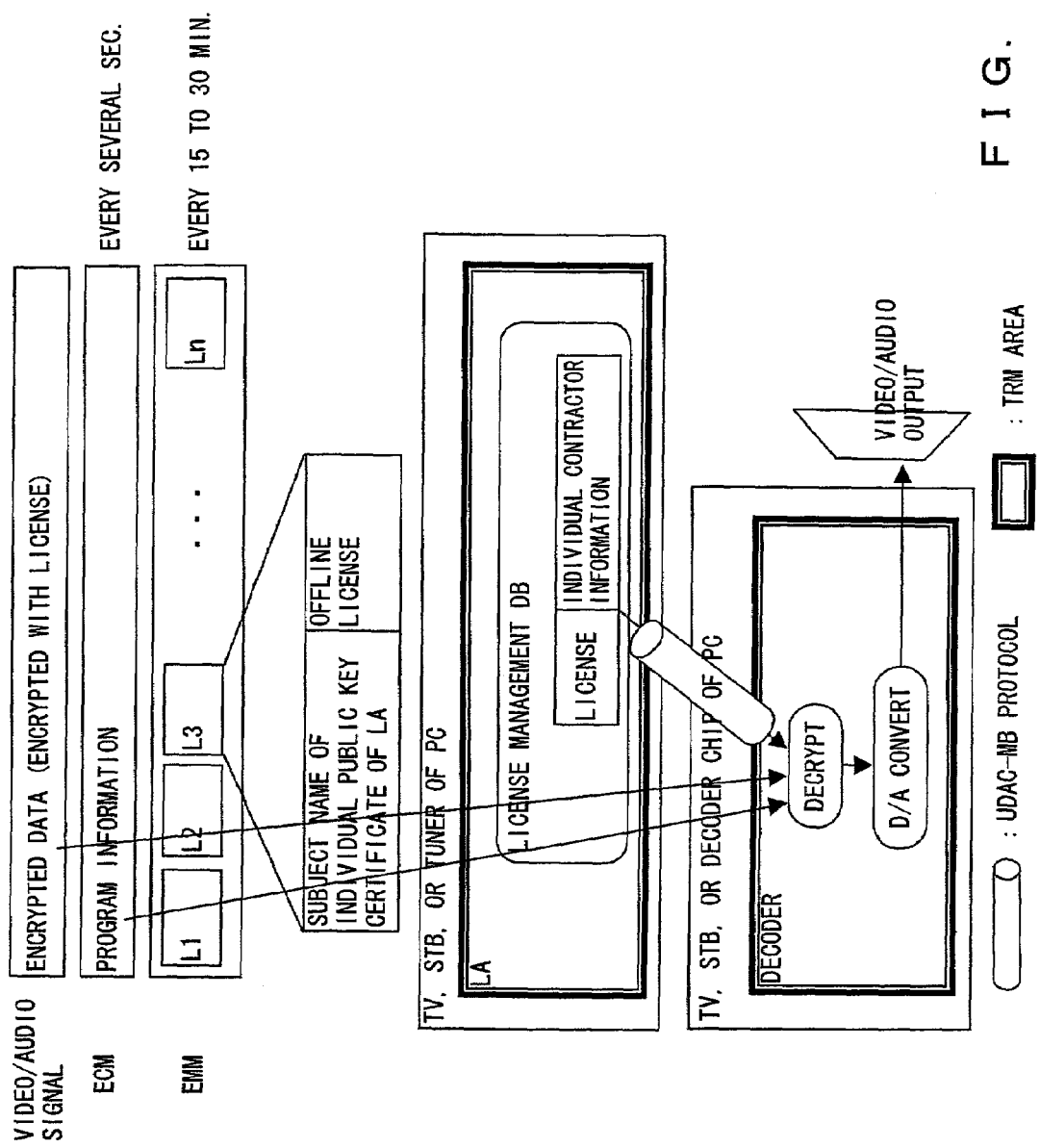
FIG. 17 is a schematic diagram showing an example of which an offline license is applied to the multicast (broadcast) (No. 2)

FIG. 16 and FIG. 17 are schematic diagrams showing examples of an offline license applied to a multicast (broadcast).

It is assumed that video/audio data is transmitted in the MPEG2 format.

1) When each user contracts with the broadcasting company for a subscription, he or she registers (sends) an individual public key certificate of the LA of a reception tuner to the broadcasting company. The LA according to the embodiment is built in the tuner.

2) After the user has contacted with the broadcasting company for the subscription, he or she turns on the power of the tuner.

Li are offline licenses generated with the individual public key of the LA of the users i.

Li (offline licenses) of all the subscribers are transmitted with EMM (Entitlement Management Message: qualification information (subscription information in the case of a broadcast) at intervals of 15 to 30 minutes. In FIGS. 16 and 17, ECM (Entitlement Check Message) is a scramble key and a license.

In the examples, it is assumed that individual subscriber information is added to an offline license and that the license management database has an additional field for individual subscriber information.

A pair of a license stored in the license management database of the LA and an individual contractor information are sent to a decoder corresponding to the UDAC-MB protocol.

The decoder decrypts the encrypted data received from the tuner with the license and reproduces the decrypted data.

The decoder determines whether or not the decrypted data can be reproduced corresponding to program information of a program being received and the individual subscription information.

In this system, since the broadcasting station and the user side (LA) do not share a secret key, a plurality of broadcast programs (using an offline license system) can be received with one tuner. Of course, no IC card is required.

Figure 18:
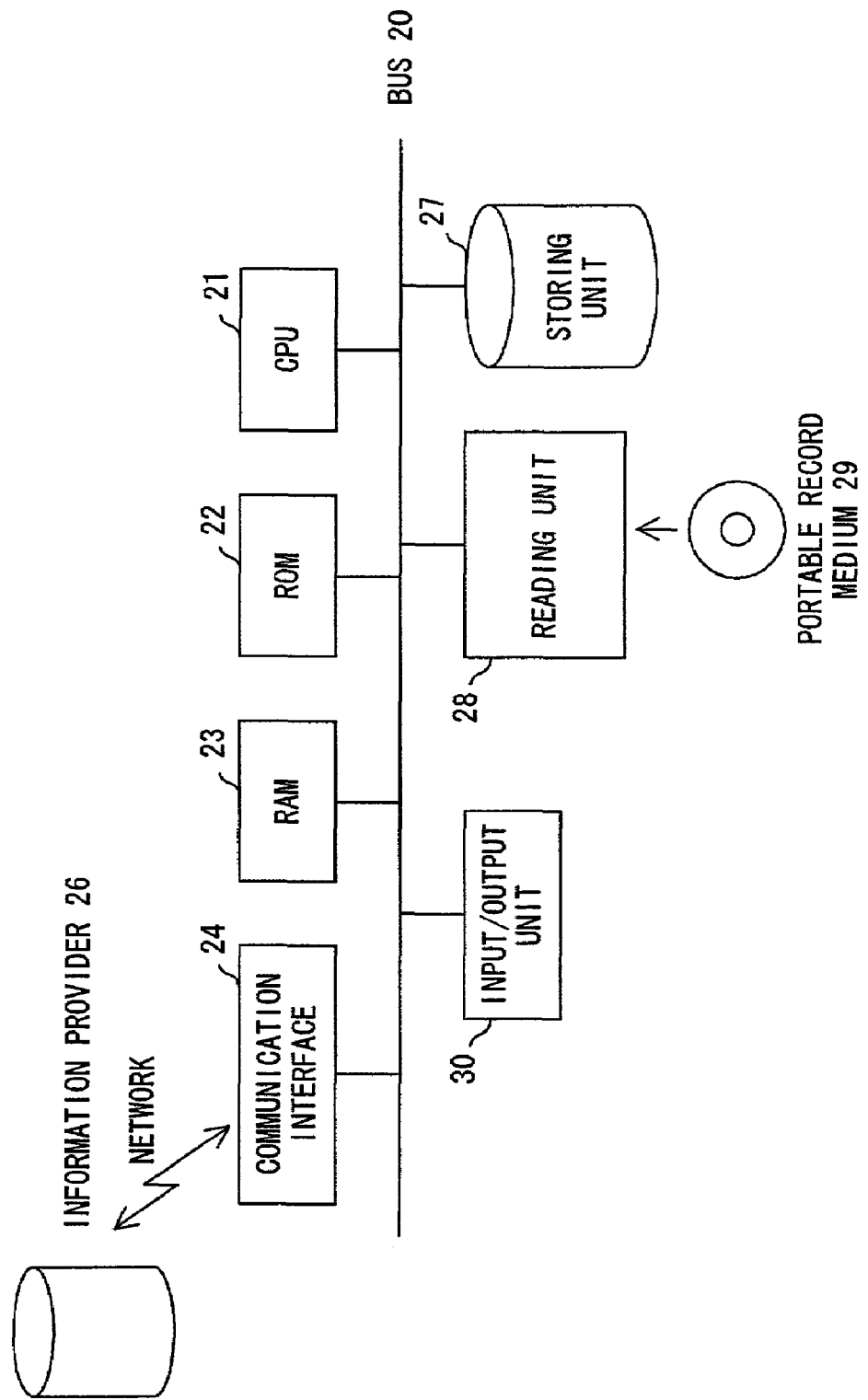
FIG. 18 is a schematic diagram showing a hardware environment of a computer necessary for accomplishing the embodiment of the present invention by a program.

FIG. 18 is a schematic diagram showing a hardware environment of a computer necessary for accomplishing the embodiment of the present invention with a program.

A CPU 21 copies a program that has been read from a recording unit 27 (such as a hard disk) or a reading unit 28 connected to a bus 20 and stored in a portable record medium (such as a floppy disk, a CD-ROM, or a DVD) to a RAM 23 and executes the program with the RAM 23. Alternatively, with the program stored in a ROM 22, the computer may be used as a dedicated machine. In addition, the ROM 22 stores a basic program such as BIOS.

An input/output unit 30 is a display unit, a keyboard, a mouse, a template, and so forth. The input/output unit 30 sends a command of a user to the CPU 21 and presents a processed result to the user.

A communication interface 24 communicates with an information provider 26 through a network 25 so as to download the program of the information provider 26 from a record medium. The downloaded program is stored to a storing unit 27 or the portable record medium 29. Alternatively, the program can be executed in a network environment.

When the PC according to the embodiment of the present invention is accomplished by a computer, the TRM area should be disposed. The TRM area may be formed with a program executed by the CPU 21. Alternatively, a TRM chip as hardware may be connected to the bus 20 so that the TRM chip dedicatedly performs a process for an offline license.

Many Japanese patent applications that relate to the UDAC-MB/LB according to the embodiment of the present invention have been filed. The UDAC-MB/LB is known as KdM standard. Examples of those Japanese patent applications are:

Japanese Patent Application No. HEI 05-257816
Japanese Patent Application No. HEI 08-101867
Japanese Patent Application No. HEI 08-106382
Japanese Patent Application No. HEI 08-190682
Japanese Patent Application No. HEI 11-099482
Japanese Patent Application No. HEI 04-058048
Japanese Patent Application No. HEI 06-238060
Japanese Patent Application No. HEI 06-225228
Japanese Patent Application No. HEI 07-001798
Japanese Patent Application No. HEI 11-099482

According to the present invention, since a license of electronic data is formed as an offline license, it can be safely transferred to a user of the reception side. Thus, electronic data can be suppressed from being illegally copied and can be properly distributed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An information terminal unit used for distributing a license for encrypted content between users, the information terminal unit comprising:

a first storing unit storing a license in a first form for an encrypted content;

a second storing unit storing a generation log of a license in a second form; and a license agent unit generating a license in the second form with a license in the first form for an encrypted content by including a step of encrypting the license in the first form with a public key of the reception side of the license and a session key, generating a license in the first form for an encrypted content with the license in the second form by including a step of decrypting the license in the second form with both a secret key of the reception side of the license and a session key, storing the generated license in the first form for the encrypted content to the first storing unit, updating a generation log for each license in the second form, and storing the generation log to the second storing unit, wherein the license in the second form is transmitted to the license agent unit of another information terminal unit so that a license in the first form for a content is generated with the transmitted license in the second form by the license agent unit of a reception side.

2. The information terminal unit as set forth in claim 1, wherein the license agent unit is disposed in a tamper resistant module area.

3. The information terminal unit as set forth in claim 1, wherein the license agent unit has a function for extracting the encrypted license in the second form in a regular electronic file format.

4. The information terminal unit as set forth in claim 1, wherein the license agent unit can generate the same license in the second form without a risk of which copies of the license that are used by users are generated.

5. The information terminal unit as set forth in claim 1, wherein the license agent unit uses the generation log so as to prevent a license in the first form corresponding to a license in the second form that has been transferred from being stored again when a license in the second form is received.

6. An information terminal unit used for receiving a license for a content that is multicast using an encrypted broadcast signal to a plurality of subscribers, the information terminal unit comprising:

a storing unit storing a license in a first form for a content; and a license agent unit generating a license in the first form for a content with a received license in a second form by including a step of decrypting the license in the second form with both a secret key of the reception side of the license and a session key, and storing the generated license in the first form to the storing unit, wherein licenses in the second form for all subscribers are placed in the broadcast signal at predetermined intervals, and wherein a license in the first form to decrypt an encrypted broadcast signal is generated with a license in the second form corresponding to the information terminal unit.

7. The information terminal unit as set forth in claim 6, wherein the storing unit and the license agent unit are disposed in a tamper resistant module area.

8. A method for distributing a license for an encrypted content between users using information terminal units, the method comprising:

storing a license in a first form for an encrypted content to a first storing unit;

generating a license in a second form with the stored license in the first form for the encrypted content by including a step of encrypting the license in the first form with both a public key of a reception side of the license and a session key;

updating a generation log of the license in the second form and storing the generation log to a second storing unit; and transmitting the license in the second form to another information terminal unit.

9. A method for distributing a license for an encrypted content between users using information terminal units, the method comprising:

receiving a license in a second form from another information terminal unit;

generating a license in a first form for an encrypted content with the received license in the second form by including a step of decrypting the license in the second form with both a secret key of a reception side of the license and a session key;

storing the generated license in the first form to a first storing unit; and updating a generation log for the license in the second form and storing the updated generation log to a second storing unit.

10. The method as set forth in claim 8, wherein the generating the license in the second form and exchanging the license in the second form between the information terminal units are performed by a license agent unit of each of the information terminal units that performs a step of generating the license in the second form.

11. The method as set forth in claim 9, wherein the generating the license in the first form and exchanging the license in the second form between the information terminal units are performed by a license agent unit of each of the information terminal units that performs a step of generating the license in the first form.

12. The method as set forth in claim 11, wherein when the license in the first form generating step is performed, the license agent unit uses the generation log so as to prevent a license in the first form corresponding to a license in the second form that has been transferred from being stored again.

13. A method for distributing a license for a content that is multicast using an encrypted broadcast signal to a plurality of subscribers, the method comprising:

receiving a broadcast signal, licenses in a second form of all subscribers having been inserted into the broadcast signal at proper intervals;

extracting a license in the second form corresponding to an information terminal unit of a relevant subscriber from the broadcast signal; and generating a license in a first form to decrypt the encrypted broadcast signal with the extracted license in the second form by including a step of decrypting the license in the second form with both a secret key of the reception side of the license and a session key.

14. A method for distributing a license for a content that is multicast using an encrypted broadcast signal to a plurality of subscribers, the method comprising:

encrypting a broadcast signal; and inserting licenses in a second form corresponding to all subscribers into the broadcast signal at proper intervals, the licenses in the second form being used to generate licenses in a first form to decrypt the encrypted broadcast signal wherein generating the license in the first form includes a step of decrypting the license in the second form with both a secret key of the reception side of the license and a session key.

15. A computer-readable record medium on which a program has been stored, the program causing an information terminal unit to perform a method for distributing a license for an encrypted content between users using information terminal units, the method comprising:

storing a license in a first form for an encrypted content to a first storing unit;

generating a license in a second form with the stored license in the first form for the encrypted content by including a step of encrypting the license in the first form with both a public key of a reception side of the license and a session key;

updating a generation log of the license in the second form and storing the generation log to a second storing unit; and transmitting the license in the second form to another information terminal unit.

16. A computer-readable record medium on which a program has been stored, the program causing an information terminal unit to perform a method for distributing a license for an encrypted content between users using information terminal units, the method comprising:

receiving a license in a second form from another information terminal unit;

generating a license in a first form for an encrypted content with the received license in the second form by including a step of decrypting the license in the second form with both a secret key of a reception side and a session key;

storing the generated license in the first form to a first storing unit; and updating a generation log for the license in the second form and storing the updated generation log to a second storing unit.

* * * * *